United States Patent
Hinosugi et al.

(10) Patent No.: US 8,520,688 B2
(45) Date of Patent: Aug. 27, 2013

(54) RECEIVER DEVICE, TRANSMISSION SYSTEM, AND PACKET TRANSMISSION METHOD

(75) Inventors: Hideki Hinosugi, Tokyo (JP); Yoshihiko Sakata, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 858 days.

(21) Appl. No.: 12/573,193

(22) Filed: Oct. 5, 2009

(65) Prior Publication Data

US 2010/0085980 A1      Apr. 8, 2010

(30) Foreign Application Priority Data

Oct. 6, 2008    (JP) .................................. 2008-259639

(51) Int. Cl.
*H04L 12/28* (2006.01)
*H04L 12/56* (2006.01)

(52) U.S. Cl.
USPC .......................................... 370/401; 370/400

(58) Field of Classification Search
None
See application file for complete search history.

(56) References Cited

U.S. PATENT DOCUMENTS

| | | | |
|---|---|---|---|
| 6,977,896 B1 | 12/2005 | Kobayashi | |
| 2003/0118042 A1* | 6/2003 | Nishida et al. | 370/404 |
| 2007/0091927 A1* | 4/2007 | Apostolopoulos et al. | 370/473 |
| 2007/0112994 A1* | 5/2007 | Sandven et al. | 710/310 |
| 2008/0013550 A1* | 1/2008 | Yamauchi | 370/400 |

FOREIGN PATENT DOCUMENTS

| | | |
|---|---|---|
| JP | 06-232898 | 8/1994 |
| JP | 06-237418 | 8/1994 |
| JP | 09-135228 | 5/1997 |
| JP | 10-041958 | 2/1998 |
| JP | 2001-045066 | 2/2001 |
| JP | 2003-018203 | 1/2003 |
| JP | 2005-064648 | 3/2005 |

\* cited by examiner

*Primary Examiner* — Jae Y Lee
(74) *Attorney, Agent, or Firm* — Antonelli, Terry, Stout & Kraus, LLP.

(57) ABSTRACT

In a transmission system of transferring a packet input from a first device to a second device via a network, a receiver device comprises a storage module configured to successively accumulate received packets, which are transferred over a multiple transmission paths, in correlation to each of the multiple transmission paths, a packet selector configured to sequentially perform a packet selection process with respect to each of the received packets accumulated in the storage module, where after elapse of a predetermined time period since a receipt time of a first packet received by the receiver device, the packet selection process respectively reads out one packet for each of the multiple transmission paths among the received identical packets, which are accumulated in correlation to each of the multiple transmission paths, and selects one packet with higher reliability out of the read-out packets, and an output module configured to output the packet selected by the packet selector to the second device.

10 Claims, 19 Drawing Sheets

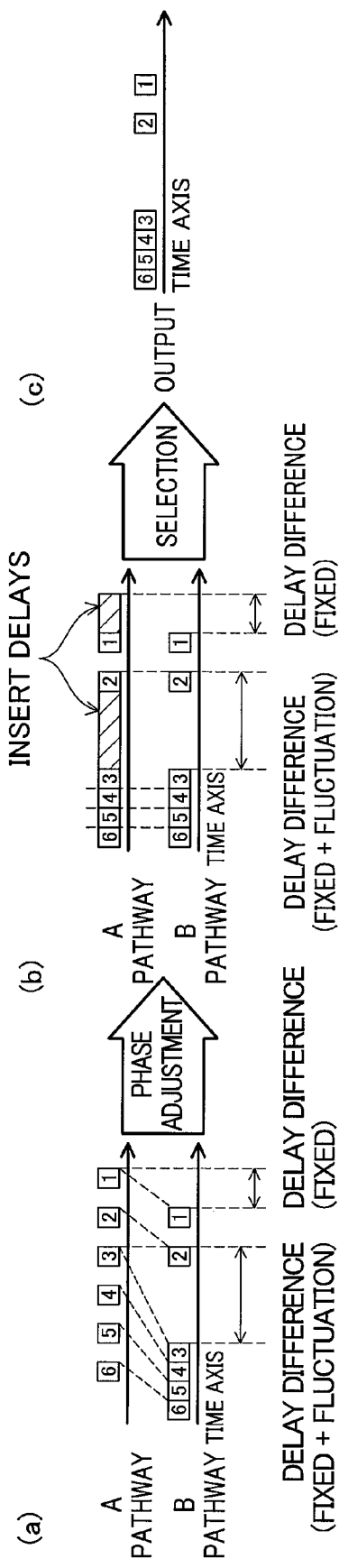

RECEIVER DEVICE, TRANSMISSION SYSTEM, AND PACKET TRANSMISSION METHOD

CROSS REFERENCE TO RELATED APPLICATIONS

This application relates to and claims priority from Japanese Patent Applications No. 2008-259639 filed on Oct. 6, 2008, the entire disclosures of which are incorporated herein by reference.

BACKGROUND

1. Technical Field

The present invention relates to a transmission system operative to transmit packets via a network.

2. Description of the Related Art

TV broadcasting and other conventional video delivery services utilize leased circuits, such as ATM (Asynchronous Transfer Model) networks. Lately developed video delivery services, on the other hand, utilize virtual leased circuits, such as the Internet or wide area Ethernet (registered trademark). The Internet and the wide area Ethernet are based on the Ethernet technique and allow extremely higher-capacity networks to be established at relatively low cost, compared with the conventional ATM network.

The Ethernet, however, has the problems of poor communication quality, for example, 'frequent packet losses' and 'significant delay fluctuation', which less arise in the ATM network. Delivery via the Internet or another network based on the Ethernet technique may cause a TV broadcast video to have flicker or accidental interruption in the course of broadcasting.

The prior art packet transfer technique generates multiple copies of each packet as a transfer object and respectively sends the generated multiple copies over multiple transmission paths. In the event of some fault or trouble arising on one transmission path, the pathway for packet transmission is switched over to another transmission path with no occurrence of fault or trouble. In the case of a switchover of the transmission path in response to detection of a fault or a trouble by high-speed fault detection technique, one frame of packets may be missing in a video stream. An instantaneous interruption-free switchover of the pathway for packet transmission on the occurrence of some fault or trouble on one transmission path would thus be highly demanded to prevent such packet missing.

One proposed technique for attaining instantaneous interruption-free switchover of the transmission path is disclosed in Japanese Patent Laid-Open No. H09-135228. FIG. 17 conceptually illustrates the configuration of a prior art transmission system 3000P disclosed in this cited reference. The prior art transmission system 3000P includes a transmitter device 100P and a receiver device 200P. The transmitter device 100P has a replication module 102P, which assigns characteristic overhead information as a mark to each user packet input from a user terminal 1000 to capsulate the packet with the overhead information, replicates the capsulated packet to generate replicated packets, and outputs the replicated packets to a transmission path 404 or an A pathway and to a transmission path 405 or a B pathway. The receiver device 200P includes a phase adjuster 214P and a selector 206P. The phase adjuster 214P equalizes the phases of packets respectively received over the two transmission paths 404 and 405 and thereby synchronizes the received packets. The selector 206P selects a normal packet, for example, a packet with no missing or a packet with no falsification, out of the synchronized packets and outputs the selected packet as a user packet to another user terminal 2000.

FIG. 18 is a conceptual view showing a transmission path switchover process in the prior art transmission system of the above cited reference using leased line service, such as ATM networks, for the transmission paths. Each solid rightward arrow represents a time axis of the A pathway or the B pathway and indicates that the righter side represents the older time (the greater past time). The column (a) of FIG. 18 conceptually shows packet intervals in the A pathway and in the B pathway. As illustrated, a stream of sequential packets transferred over the A pathway is received by the receiver device 200P earlier than a corresponding stream of sequential packets transferred over the B pathway. As is known, the ATM network has the extremely high network quality and little delay fluctuation. The phase difference of the packets received by the phase adjuster 214P (FIG. 17) is expected to be only a fixed phase difference caused by a difference between the lengths of the respective transmission paths as shown in the column (a) of FIG. 18.

The column (b) of FIG. 18 shows phase adjustment of packets with time. As mentioned above, the phase difference of the packets received by the phase adjuster 214P is expected to be only the fixed phase difference caused by the difference between the lengths of the respective transmission paths. Insertion of a fixed delay to the earlier-received stream allows synchronization of adjusting the phase of the earlier-received stream to the phase of the later-received stream. The phases of the packets are readily adjustable in this manner as shown in the column (b) of FIG. 18.

The column (c) of FIG. 18 shows output of packets. The synchronization of the phases of the packets transferred over the A pathway and over the B pathway causes no packet missing in the event of a switchover of the transmission path. This readily attains instantaneous interruption-free switchover as shown in the column (c) of FIG. 18.

FIG. 19 is a conceptual view showing a transmission path switchover process in the prior art transmission system of the above cited reference using networks based on the Ethernet technique, such as the Internet or wide area Ethernet, for the transmission paths. The column (a) of FIG. 19 conceptually shows packet intervals in the A pathway and in the B pathway. The column (b) of FIG. 19 shows phase adjustment of packets with time. The column (c) of FIG. 19 shows output of packets.

In a network based on the Ethernet technique, a significant delay fluctuation may occur in the course of packet transmission. In the illustrated example, there is a delay fluctuation in the B pathway as shown in the column (a) of FIG. 19. In the phase adjuster 214P, the phase difference between a packet transferred over the B pathway and a corresponding packet transferred over the A pathway may vary among the respective packets.

In such a case, insertion of fixed delays to the earlier-received stream for synchronization of adjusting the phase of the earlier-received stream to the phase of the later-received stream causes the packets transferred over the A pathway at a fixed packet interval to have the same delay fluctuation as that occurring in the B pathway as shown in the column (b) of FIG. 19. An output stream of packets output from the transmission system may accordingly have a partially varying packet interval or a burst (intermittent transmission of a group of packets). In the illustrated example, packets 3 through 6 have a burst as shown in the column (c) of FIG. 19. The transmission system may thus worsen the state of packet transmission. In the condition of the varying phase difference among the respective packets as shown in the column (b) of FIG. 19, phase adjustment by insertion of fixed delays is technically difficult.

SUMMARY

There would thus be a demand for preventing a variation in packet interval and a traffic burst caused by a switchover of a transmission path in transfer of packets via a network.

One aspect of the invention provides a receiver device. The receiver device comprises a storage module configured to successively receive packets which are transferred over multiple transmission paths between a first device and a second device via a network, and accumulate the packets in correlation to each of the multiple transmission paths, a packet selector configured to sequentially perform a packet selection process with respect to each of the received packets accumulated in the storage module, where after elapse of a predetermined time period since a receipt time of a first packet received by the receiver device, the packet selection process respectively reads out one packet for each of the multiple transmission paths among the received identical packets, which are accumulated in correlation to each of the multiple transmission paths, and selects one packet with higher reliability out of the read-out packets, and an output module configured to output the packet selected by the packet selector to the second device.

The receiver device according to this aspect of the invention successively accumulates the received packets and selectively outputs the packets with the higher reliability among the accumulated packets. It is assumed that some fault or trouble arises in a certain transmission path, for example, transmission path I, and that the pathway for packet transmission is accordingly switched over from the certain transmission path to another transmission path, for example, transmission path 2. Since the packets received over the transmission path 2 have been accumulated in advance, the receiver device of the invention effectively prevents potential packet missing caused by a switchover of the transmission path. The packet selector may continually read out the accumulated packets or may read out the accumulated packets at predetermined time intervals.

Various criteria may be adopted for the selection of the packets with the higher reliability. Typical examples of available criteria include the absence of garbled data, the absence of packet missing, correct order arrival of packets, detection of no ECC (Error Correcting Code) error, and detection of no FCS (Frame Check Sequence) error.

According to another aspect of the invention provides a transmission system configured to have a transmitter device and a receiver device and operated to transfer a packet input from a first device to a second device via a network.

The transmitter device comprises a first receiving module configured to receive a packet input from the first device, a band adjuster configured to, when an input band of the received packet is smaller than a preset reference band, insert a dummy packet after the received packet and thereby adjust a total band of the received packet and the inserted dummy packet to the preset reference band, and a replication module configured to replicate the received packet and the inserted dummy packet so as to generate multiple identical replicated packets and multiple identical replicated dummy packets and to respectively send the multiple identical replicated packets and the multiple identical replicated dummy packets to multiple transmission paths at the preset reference band.

The receiver device comprises a second receiving module configured to receive the multiple identical replicated packets and the multiple identical replicated dummy packets sent from the transmitter device over the multiple transmission paths, as received packets and received dummy packets, a storage module configured to successively accumulate the received packets and the received dummy packets in correlation to each of the multiple transmission paths, a packet selector configured to sequentially perform a packet selection process with respect to each of the received packets and the received dummy packets accumulated in the storage module, where after elapse of a predetermined time period since a receipt time of a first packet received by the second receiving module, the packet selection process respectively reads out one packet or one dummy packet for each of the multiple transmission paths among the received packets and the received dummy packets, which are accumulated in correlation to each of the multiple transmission paths, and selects one packet with high reliability out of the read-out packets or the rear-out dummy packets, and an output module configured to control an output band of the packets and the dummy packets sequentially selected by the packet selector to the preset reference band, discard the selected dummy packets, and output the selected packets with the controlled output band to the second device.

In the transmission system according to this aspect of the invention, the transmitter device adjusts the band of each received packet input from the first device, while the receiver device does not control the band of the received packet. This arrangement effectively reduces the processing load of the receiver device.

The technique of the present invention is not restrictively actualized by the receiver device or the transmission system having any of the configurations or arrangements discussed above, but may also be actualized by a packet transmission method as well as a relevant computer program product. The computer program product includes a computer readable recording medium. Typical examples of such recording media include flexible disks, CD-ROMs, DVD-ROMs, magneto-optical disks, memory cards, hard disks, and diversity of other media.

These and other objects, features, aspects, and advantages of the present invention will become more apparent from the following detailed description of the preferred embodiments with the accompanying drawings.

BRIEF DESCRIPTION OF THE DRAWINGS

FIG. 19 is a conceptual view showing a transmission path switchover process in the prior art transmission system using networks based on the Ethernet technique for the transmission paths.

Some modes of carrying out the invention are discussed below as preferred embodiments with reference to the accompanied drawings.

DESCRIPTION OF THE PREFERRED EMBODIMENT

A. First Embodiment
A-1. Configuration of First Embodiment

Figure 1:
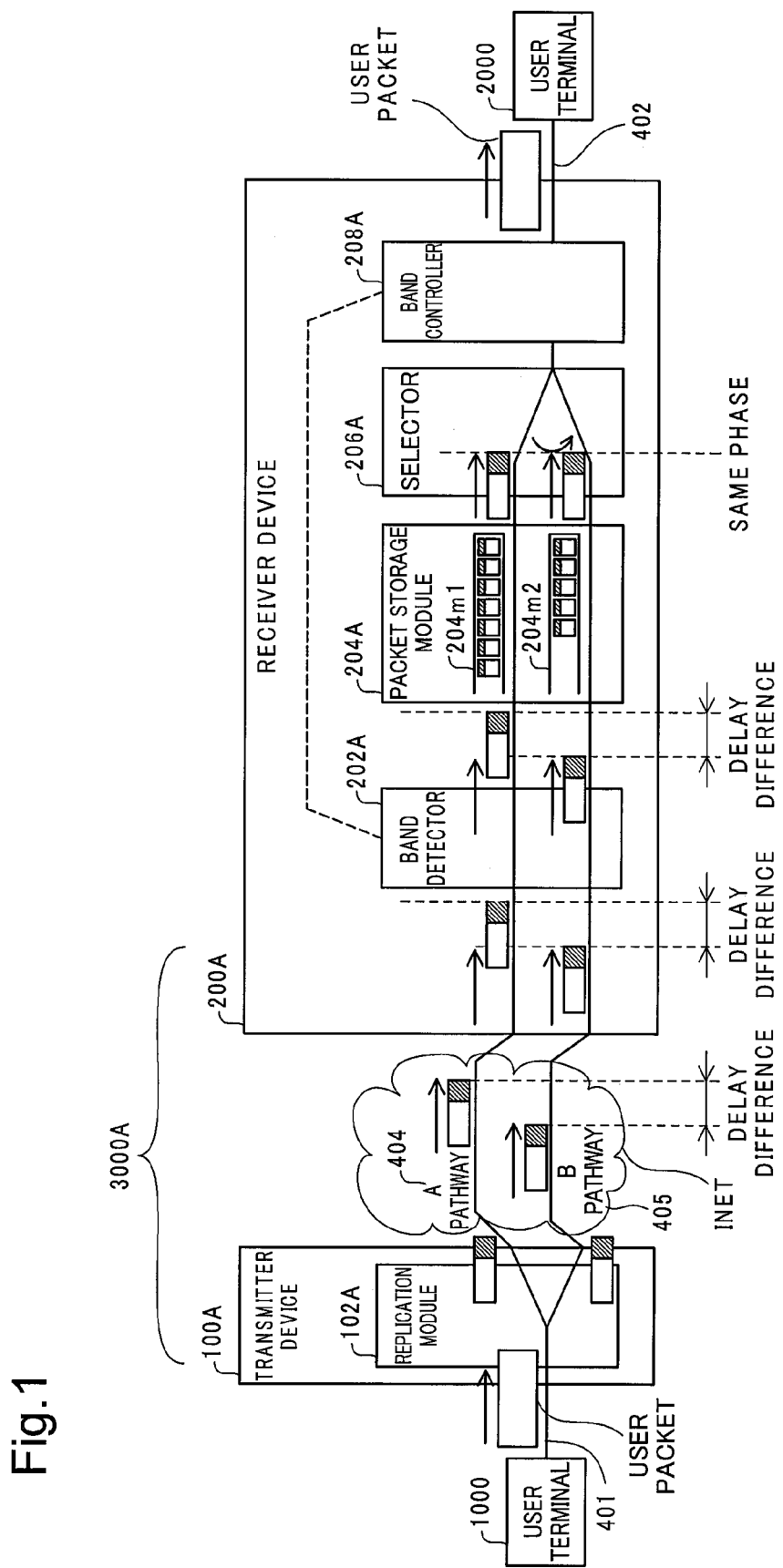
FIG. 1 is an explanatory view illustrating the configuration of one transmission system in accordance with a first embodiment of the invention.

A first embodiment of the present invention is described below. FIG. 1 illustrates the configuration of a transmission system 3000A in the first embodiment of the invention. The transmission system 3000A is located between a user terminal 1000 and another user terminal 2000 interconnected via the Internet. On the occurrence of some fault or trouble in any pathway of the Internet, the transmission system 3000A allows packets sequentially input from the user terminal 1000 to reliably reach the user terminal 2000 without causing any instantaneous interruption, that is, in an 'instantaneous interruption-free' manner. A switchover of a transmission path without causing any packet missing is referred to as 'instantaneous interruption-free switchover' in the specification hereof. As described later, each of the packets received by the transmission system 3000A is identified as a preset object or non-object of instantaneous interruption-free switchover, based on header information included in the received packet. For example, a video stream may be set as the object of instantaneous interruption-free switchover. Among all the packets received by the transmission system 3000A, there may be some packets identified as non-objects of instantaneous interruption-free switchover.

As illustrated, the transmission system 3000A of the embodiment includes a transmitter device 100A and a receiver device 200A. In the transmission system 3000A of this embodiment, both the transmitter device 100A and the receiver device 200A are constructed by routers. In other embodiments, the transmitter device 100A and the receiver device 200A may be constructed by switches or by personal computers.

As illustrated, the transmitter device 100A and the receiver device 200A are interconnected via a transmission path 404 or an A pathway and a transmission path 405 or a B pathway. The user terminal 1000 and the user terminal 2000 are respectively connected to the transmission system 3000A via a network 401 and via a network 402. For the simple explanation, only the two transmission paths 404 and 405 are shown as the transmission paths of connecting the transmitter device 100A with the receiver device 200A in this illustrated embodiment. The number of the transmission paths is, however, not restricted to 2 but may be 3 or more. Each of the transmission paths 404 and 405 appears to be a single pathway in the illustration, but is actually an independent network.

The transmitter device 100A has a replication module 102A. The replication module 102A identifies whether each of the packets input from the user terminal 1000, which is hereafter referred to as 'user packet', is the object of instantaneous interruption-free switchover as discussed later. Upon identification of the user packet as the object of instantaneous interruption-free switchover, the replication module 102A assigns overhead information to the user packet to generate a capsulated packet with the assigned information. The overhead information includes a sequence number and an 'instantaneous interruption-free switchover identifier' that is an identifier representing the object of instantaneous interruption-free switchover.

The identification of whether each user packet is the object or non-object of instantaneous interruption-free switchover is based on L2 through L4 header information included in the header information of the user packet and a preset identification condition. The replication module 102A analyzes the L2 through L4 header information of each received user packet and identifies the received user packet as the object of instantaneous interruption-free switchover based on matching of the analyzed L2 through L4 header information with the preset identification condition.

The replication module 102A then replicates the capsulated packet (hereafter may simply be referred to as 'packet') and outputs the replicated packets to the transmission path 404 or the A pathway and to the transmission path 405 or the B pathway via interfaces (not shown).

The receiver device 200A is operative to sequentially receive the packets via the transmission path 404 and via the transmission path 405, select one packet with high reliability, and output the selected packet in the original form of the user packet to the user terminal 2000. The receiver device 200A includes a band detector 202A, a packet storage module 204A, a selector 206A, and a band controller 208A. The packet storage module 204A, the selector 206A, and the band controller 208A in the configuration of this embodiment respectively correspond to the storage module, the packet selector, and the output module in the claims of the invention.

The band detector 202A identifies whether each received packet is the object of instantaneous interruption-free switchover. The identification of whether the received packet is the object or non-object of instantaneous interruption-free switchover is based on the instantaneous interruption-free switchover identifier included in the overhead information of the received packet. Upon identification of the received packet as the object of instantaneous interruption-free switchover, the band detector 202A computes an input band of the received packet and extracts a sequence number of the packet from its assigned overhead information. The band detector 202A then stores the received packet into the packet storage module 204A. The input band is computed according to Equation (1) given below:

(Input Band)=(Packet Size)/(Packet Arrival Interval)  (1)

For example, when the packet size of the received packet is 84 bytes and the packet arrival interval is 672 nsec, the input band is computed as:

(Input Band)=84×8 [bits]/672 [nsec]=1[Gbps]

The packet storage module 204A includes a memory 204m1 provided for the transmission path 404 and a memory 204m2 provided for the transmission path 405. Each of the memories 204m1 and 204m2 is used to temporarily store the received packets. Each of the memories 204m1 and 204m2 is designed to have a memory capacity sufficient for absorbing a delay difference and a delay fluctuation. The memory capacity is calculated according to Equation (2) given below:

(Memory Capacity)=(Line Speed)×(Allowed Fluctuation Time)  (2)

For example, when the line speed is 1 Gps and the allowed fluctuation time is 0.1 msec, the memory capacity is calculated as:

$$\begin{aligned}(\text{Memory Capacity}) &= 1\ [Gbps] \times 0.1\ [msec] \\ &= 10\ [Mbit] \\ &= 1.25\ [Mbyte]\end{aligned}$$

The allowed fluctuation time may be set according to the following procedure. In application of wide area Ethernet, information on delay fluctuation is often disclosed as one term of SLA or Service Level Agreement. In such cases, the procedure may set the allowed fluctuation time based on the disclosed information regarding the amount of delay fluctuation. In application of a network with no such Service Level Agreement, for example, the Internet, on the other hand, the procedure may actually measure the amount of delay fluctuation and set the allowed fluctuation time based on the result of the measurement.

The selector 206A respectively reads out one packet from the storage of the memory 204m1 and one packet from the storage of the memory 204m2 in the packet storage module 204A and compares the two read-out packets with each other to select one packet with high reliability, which is to be output as the user packet.

The high reliability of a packet may be determined in the following manner. When one of the two read-out packets includes garbled data, the other packet with no garbled data is determined to have the high reliability. When one of the two transmission paths causes packet missing, a packet transferred via the other transmission path without causing packet missing is determined to have the high reliability. When there is any packet arriving in a wrong order, a packet arriving in a correct order is determined to have the high reliability.

A packet with detection of an ECC (Error Correcting Code) error or an FCS (Frame Check Sequence) error is identified as an NG packet. When one of the two read-out packets is identified as an NG packet, the other packet that is identified as a non-NG packet is determined to have the high reliability.

On condition that both the two read-out packets are determined to have the high reliability, the selector 206A may select a packet received earlier out of the two read-out packets, as the packet with high reliability. In this condition, the selector 206A may alternatively select a packet received via the transmission path provided for the memory 204m1 or 204m2 with the storage of a greater number of packets, as the packet with high reliability.

The band controller 208A deletes the overhead information from the selected packet and thereby returns the status of the packet to the original form of the user packet input from the user terminal 1000. The band controller 208A controls an output band of the user packet, which is to be output to the user terminal 2000 and may thus be hereafter referred to as 'output packet', and outputs the user packet with the controlled output band. The output band of the user packet is controlled based on the sequence number and the input band computed by the band detector 202A, so as to be made equal to the input band computed by the band detector 202A as shown by a broken line in FIG. 1. The transmission interval of the output packet from the receiver device 200A is thus kept equal to the reception interval of the input packet into the receiver device 200A.

A-2. Operations of First Embodiment

Figure 2:
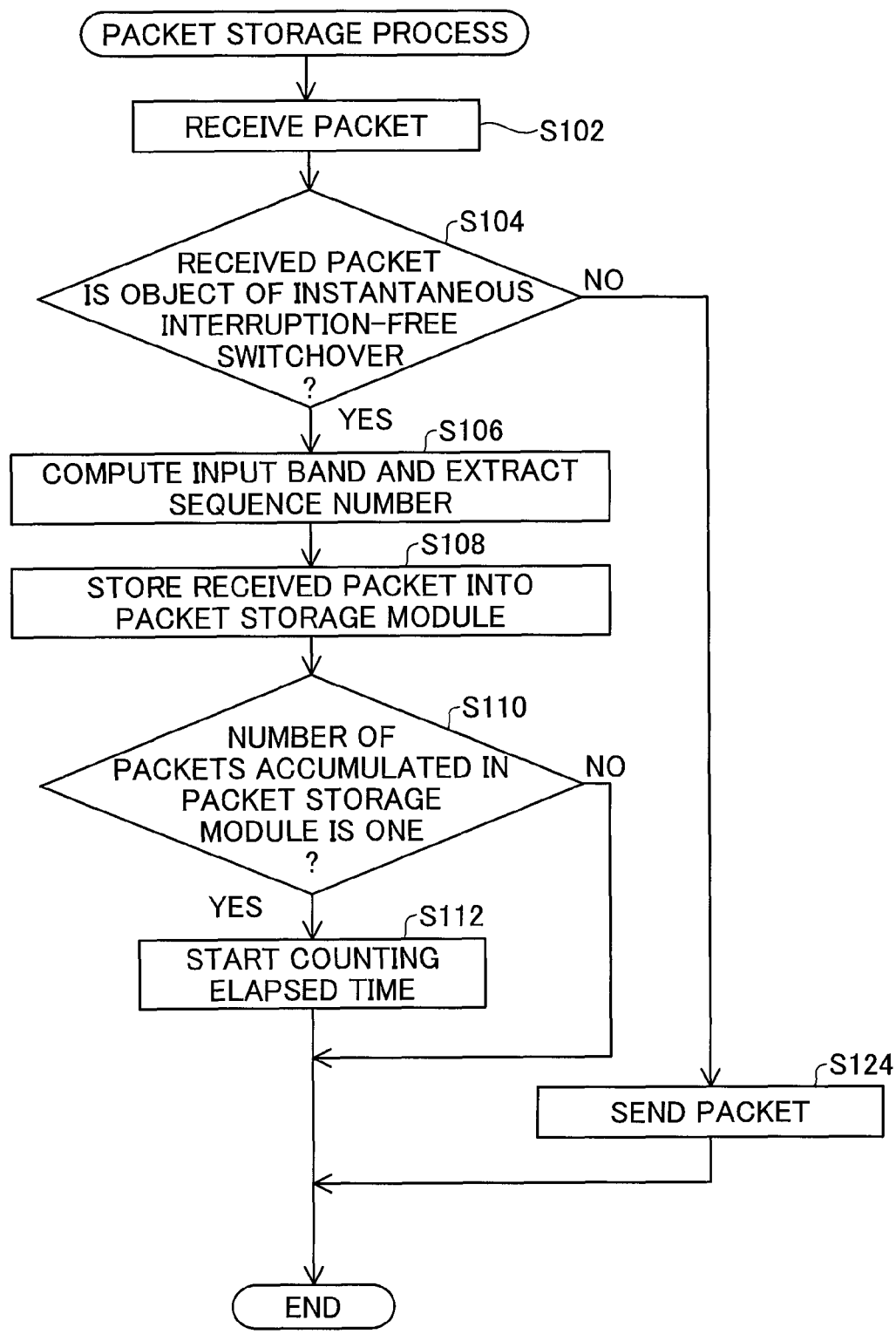
FIG. 2 is a flowchart showing a packet storage process performed by a receiver device in the transmission system of the first embodiment.
Figure 3:
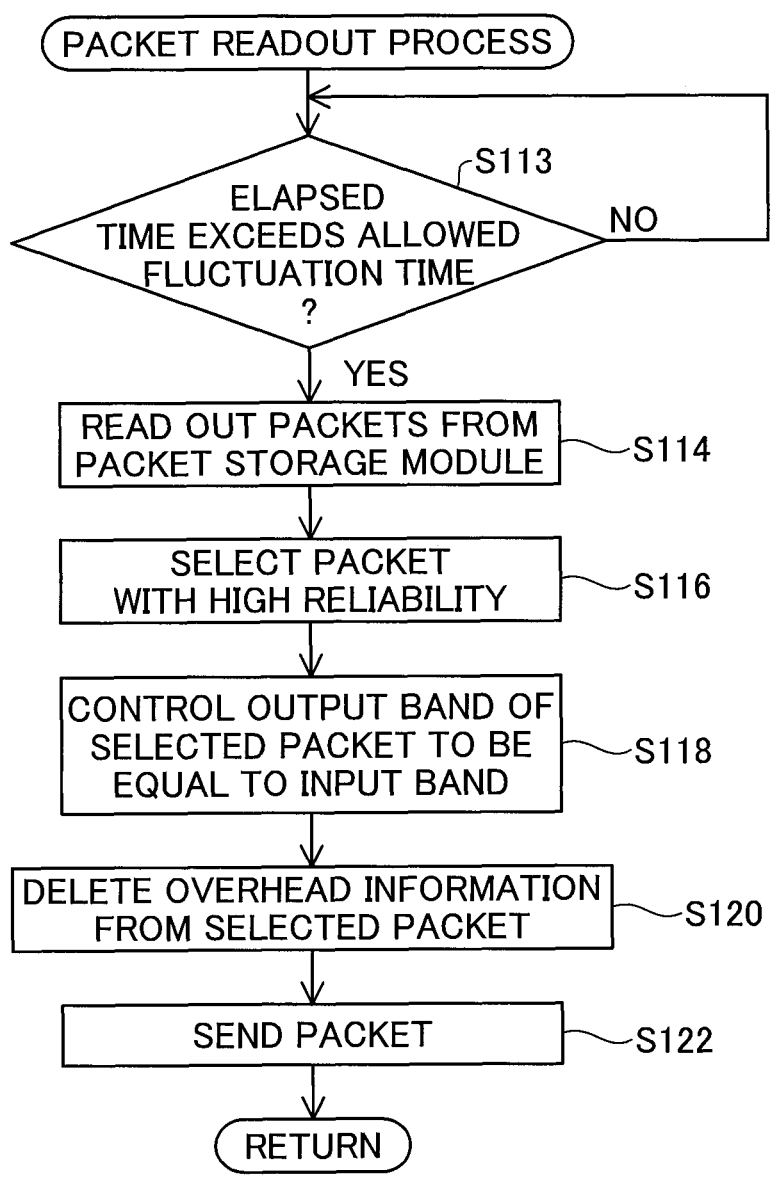
FIG. 3 is a flowchart showing a packet readout process performed by the receiver device in the first embodiment.

Series of operations performed in the transmission system 3000A of the embodiment are described with reference to FIGS. 1 through 3. FIG. 2 is a flowchart showing a packet storage process performed by the receiver device 200A of the embodiment. This packet storage process is executed in response to detection of every packet reception by the band detector 202A. FIG. 3 is a flowchart showing a packet readout process performed by the receiver device 200A of the embodiment. This packet readout process is triggered by detection of every packet reception by the band detector 202A. Every time a packet is received, the received packet is stored. The receiver device 200A thereby successively accumulates the packets as discussed below with reference to the flowchart of FIG. 2. When the allowed fluctuation time has elapsed since reception of a first packet, the receiver device 200A sequentially reads out the accumulated packets and selectively outputs adequate packets as discussed below with reference to the flowchart of FIG. 3.

In the transmission system 3000A of the embodiment, it is assumed that a packet transferred via the transmission path 404 arrives at the receiver device 200A earlier than a corresponding packet transferred via the transmission path 405 as shown in FIG. 1. The following describes a series of processing performed by the receiver device 200A when a packet having a sequence number 1 is transferred via the transmission path 404 and enters the receiver device 200A. In the description below, the packet of the sequence number 1 transferred via the transmission path 404 or the A pathway to the receiver device 200A is named 'packet A1'.

The series of packet storage process performed by the receiver device 200A is explained with reference to the flowchart of FIG. 2. The band detector 202A (FIG. 1) receives the packet A1 transferred from the transmitter device 100A (step 5102) and analyzes the overhead information included in the received packet A1 to identify whether the user packet included in the received packet A1 is the object or non-object of instantaneous interruption-free switchover (step S104).

Upon identification of the user packet as the object of instantaneous interruption-free switchover (step S104: YES), the band detector 202A in step S106 computes the input band of the received packet A1, extracts the sequence number from the overhead information of the packet A1, and records the extracted sequence number and the computed input band into a memory (not shown). The band detector 202A then stores the received packet A1 into the memory 204m1 of the packet storage module 204A (FIG. 1) (step S108).

Subsequently the selector 206A determines whether the number of packets currently accumulated in the packet storage module 204A is one or multiple (step S110). At this moment, only one packet A1 has been stored in the memory 204m1, while there is no other packet accumulated in the packet storage module 204A (step S110: YES). The selector 206A accordingly starts counting elapsed time (step S112) and terminates the packet storage process. The 'elapsed time' herein represents a time period elapsed since reception of the first packet by the receiver device 200A. Since the first packet received by the receiver device 200A is the packet A1 in this embodiment, the elapsed time represents a time period elapsed since reception of the packet A1. The elapsed time is initially set to a value '0'.

As mentioned above, the packet of the sequence number 1 transferred via the transmission path 405 or the B pathway arrives at the receiver device 200A later than the packet of the sequence number 1 transferred via the transmission path 404 or the A pathway. In the description below, the packet of the sequence number 1 transferred via the transmission path 405 or the B pathway to the receiver device 200A is named 'packet B1'. Similarly a packet of a sequence number 2 transferred via the transmission path 404 or the A pathway to the receiver device 200A is named 'packet A2'. The packet of the sequence number 2 transferred via the transmission path 405 or the B pathway to the receiver device 200A is named 'packet B2'. In this manner, each packet received over each transmission path is named by the combination of the transmission path with the sequence number of the packet.

With referring back to the flowchart of FIG. 2, the band detector 202A (FIG. 1) receives the packet B1 transferred from the transmitter device 100A (step S102) and analyzes the overhead information included in the received packet B1 to identify whether the user packet included in the received packet B1 is the object or non-object of instantaneous interruption-free switchover (step S104).

The packet B1 is substantially identical with the packet A1, so that the packet B1 is identified as the object of instantaneous interruption-free switchover (step S104: YES). The band detector 202A in step S106 accordingly computes the input band of the received packet B1, extracts the sequence number from the overhead information of the packet B1, and records the extracted sequence number and the computed input band into the memory (not shown). The band detector 202A in step S108 then stores the received packet B1 into the memory 204m2 of the packet storage module 204A (FIG. 1).

Subsequently the selector 206A determines whether the number of packets currently accumulated in the packet storage module 204A is one or multiple (step S110). At this moment, the packet B1 has been stored in the memory 204m2, while the packet A1 has been stored in the memory 204m1. The number of packets currently accumulated in the packet storage module 204A is accordingly equal to 2 (step S110: NO). The selector 206A then terminates the packet storage process.

The band detector 202A (FIG. 1) successively receives packets in a sequence of packets A2, B2, A3, B3. As long as each received packet is identified as the object of instantaneous interruption-free switchover (steps S102 and S104), the processing of steps S106 through S112 (in the flowchart of FIG. 2) is repeated to accumulate the received packet into the packet storage module 204A (FIG. 1).

In response to reception of the packet A1 by the band detector 202A, the selector 206A determines whether the elapsed time exceeds the 'allowed fluctuation time' (step S113 in the flowchart of FIG. 3). At this moment, the elapsed time is '0' (step S113: NO), so that the processing flow returns to step S113 to determine the elapse of the allowed fluctuation time again. Namely the selector 206A repeats the processing of step S113 until the allowed fluctuation time has elapsed.

The packet readout process performed by the receiver device 200A is explained with reference to the flowchart of FIG. 3. When the allowed fluctuation time has elapsed since reception of the packet A1 by the band detector 202A, the selector 206A determines the elapse of the allowed fluctuation time (step S113: YES) and respectively reads out one packet from the memory 204m1 and one packet from the memory 204m2 in the packet storage module 204A (step S114). The selector 206A reads out one packet from each of the memories 204m1 and 204m2 in the packet storage module 204A in the FIFO (first-in first-out) manner. Namely the packets accumulated in each of the memories 204m1 and 204m2 in the packet storage module 204A are read out in a chronological order. At this moment, the selector 206A reads out the packet A1 from the memory 204m1 and the packet B1 from the memory 204m2.

The selector 206A subsequently selects one packet with the high reliability out of the two read-out packets (step S116) as explained previously. It is here assumed that the packet A1 is selected as the packet with the high reliability. The band controller 208A controls the output band of the selected packet A1 to be made equal to the input band of the packet A1 computed at step S106 (step S118). The band controller 208A deletes the overhead information from the packet A1 and thereby returns the status of the packet A1 to the original form of the user packet input from the user terminal 1000 (step S120). The band controller 208A then sends the user packet to the user terminal 2000 (step S122) and returns to step S113.

On completion of the packet transmission at step S122, the selector 206A again determines the elapse of the allowed fluctuation time (step S113: YES). The selector 206A then reads out the packet A2 and the packet B2 from the respective memories in the packet storage module 204A (step S114) and selects one packet with the high reliability out of the two read-out packets (step S116). The band controller 208A controls the output band of the selected packet (step S118), deletes the overhead information from the selected packet to return the selected packet to the original form of the user packet (step S120), and sends the user packet to the user terminal 2000 (step S122). The processing flow again returns to step S113.

Since the allowed fluctuation time has elapsed since reception of the packet A1 by the band detector 202A, the selector 206A again determines the elapse of the allowed fluctuation time (step S113: YES). The processing flow then repeats the processing of steps S114 through S122 and returns to step S113 again.

In the receiver device 200A, the received packets are successively accumulated in the packet storage module 204A (steps S102 through S108 in FIG. 2). After elapse of the allowed fluctuation time since reception of the first packet with the sequence number 1, the receiver device 200A sequentially reads out the packets accumulated in the packet storage module 204A, selects the packets with the high reliability, and sends the user packets obtained from the selected packets (steps 5114 through S122 in FIG. 3). In the transmission system 3000A of this embodiment, the packets are successively accumulated in the packet storage module 204A. A switchover of the transmission path does not cause any packet missing, since subsequent packets are present in the packet storage module 204A.

Referring back to the flowchart of FIG. 2, upon identification of the received packet as non-object of instantaneous interruption-free switchover by the band detector 202A (step S104: NO), the transmission system 3000A sends the received packet to the user terminal 2000 (step S124) with skipping the processing of steps S106 through S112 and then immediately terminates the packet storage process.

After reception of the packet A1 by the band detector 202A, both the transmission paths 404 and 405 may be assumed to have some faults or troubles and prevent any subsequent packet from reaching the receiver device 200A. On elapse of the allowed fluctuation time since reception of the packet A1 by the band detector 202A, the selector 206A tries to read out packets from the respective memories in the packet storage module 204A (step S114 in FIG. 3). In this state, while the packet A1 has been stored in the memory 204$m$1, there is no packet stored in the memory 204$m$2. The selector 206A accordingly fails to read out any packet from the memory 204$m$2, while succeeding in reading out the packet A1 from the memory 204$m$1. The selector 206A then selects the packet A1 as the packet with the high reliability (step S116), controls the output band of the selected packet A1 to be equal to the input terminal computed at step S106 (step S118), deletes the overhead information from the selected packet A1 to create a user packet 1 (step S120), and outputs the user packet 1 (step S122). In this state, only the user packet 1 is output to the user terminal 2000.

A-3. Effects of First Embodiment

Figure 4:
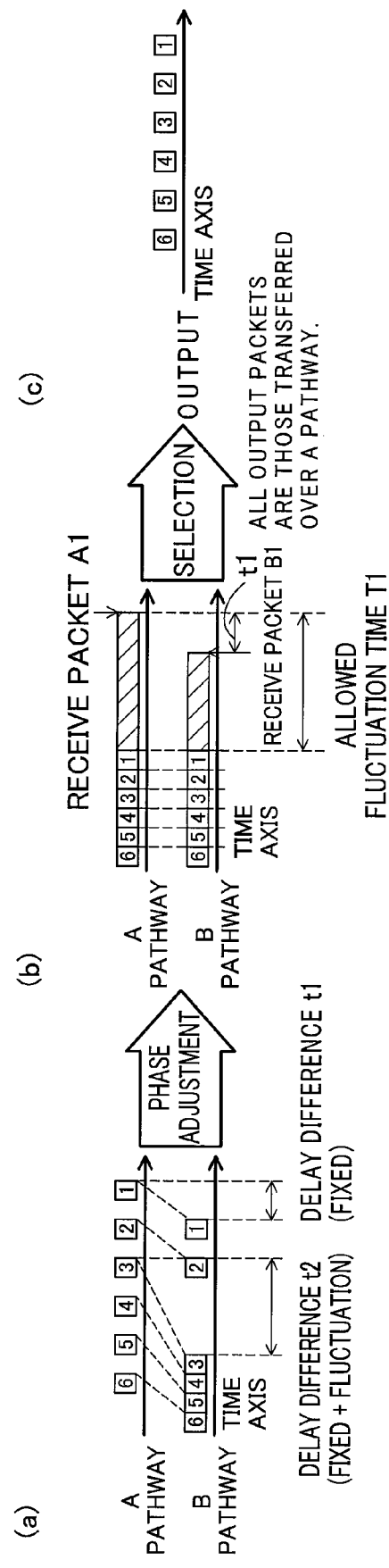
FIG. 4 is a conceptual view showing a series of processing performed by the receiver device on the occurrence of delay fluctuation in a B pathway.

The effects of the first embodiment are described below with reference to FIGS. 4 through 6. The effect of the first embodiment on the occurrence of delay fluctuation in the B pathway is explained with reference to FIG. 4. FIG. 4 is a conceptual view showing a series of processing performed by the receiver device 200A on the occurrence of delay fluctuation in the B pathway. Each solid rightward arrow represents a time axis of the A pathway or the B pathway and indicates that the righter side represents the older time (the greater past time). The respective packets are shown by numerals in squares. In the illustrated example of FIG. 4, both the A pathway and the B pathway have no faults or troubles, and all packets A1 through A6 and packets B1 through B6 are error-free packets.

The column (a) of FIG. 4 conceptually shows packet intervals in the A pathway and in the B pathway. As shown in the column (a) of FIG. 4, the packets are transferred at a fixed packet interval or a fixed band in the A pathway, while the B pathway has a delay difference relative to the A pathway. The 'delay difference' herein represents a difference between a transmission time or an arrival time of a packet over the A pathway and a transmission time or an arrival time of the corresponding packet over the B pathway when the packet is transferred from the transmitter device 100A to the receiver device 200A via the A pathway and via the B pathway. The delay difference in the B pathway includes a fixed delay difference t1 ascribed to a difference between the lengths of the respective transmission paths and a varying delay difference t2 (<t1) including 'fluctuation'. The terminology 'fluctuation' herein represents a variation in transfer speed or a variation in arrival time among the respective packets. Namely the delay difference of the B pathway relative to the A pathway has some variation among the respective packets. When there are three or more transmission paths, the 'delay difference' represents a difference from an earliest arrival time of a packet transferred over one of the transmission paths, which allows the packet to arrive at the receiver device 200A at the earliest timing.

As shown in the column (a) of FIG. 4, the interval between the packet B1 and the packet B2 in the B pathway is equal to the interval between the packet A1 and the packet A2 in the A pathway. The interval between the packet B2 and the packet B3 is greater than the interval between the packet B1 and the packet B2. The intervals between the respective adjacent packets of the packets B3 through B6 are smaller than the interval between the packet B1 and the packet B2, so that the packets B3 through B6 are burst. The 'burst' herein means that consecutive packets irregularly appear on the transmission path within a relatively short time period and are intermittently transferred in some lumps. In the illustrated example of the column (a) of FIG. 4, there is a wider packet interval after the packet B2, and the packets B3 through B6 are transferred in one lump. Namely the packets B3 through B6 are burst.

The received packets are sequentially read out after elapse of an allowed fluctuation time T1 as explained previously. The column (b) of FIG. 4 conceptually shows a process of reading out packets with time. The packet B1 is received with a delay after reception of the packet A1 as shown in the column (a) of FIG. 4. Namely the packet A1 is read out after elapse of the allowed fluctuation time T1 since its reception, while the packet B1 is read out after elapse of the (allowed fluctuation time T1−fixed delay difference t1) since its reception.

The column (c) of FIG. 4 conceptually shows output of packets. As mentioned previously, all the packets A1 through A6 and the packets B1 through B6 are error-free packets. The packets A1 through A6 arriving earlier at the receiver device 200A are thus selected and output as output packets 1 through 6 to the user terminal 2000. The packets A1 through A6 enter the receiver device 200A at the fixed band or at the fixed packet interval as shown in the column (a) of FIG. 4. The receiver device 200A of the embodiment controls the output band of the respective output packets 1 through 6 to be equal to the input band of the packets A1 through A6 and outputs the output packets 1 through 6 with the controlled output band. An output stream of the output packets 1 through 6 controlled to have the fixed interval is thus supplied to the user terminal 2000.

The effect of the first embodiment on the occurrence of delay fluctuation in the B pathway and some fault or trouble in the A pathway is explained with reference to FIG. 5. FIG. 5 is a conceptual view showing a series of processing performed by the receiver device 200A on the occurrence of delay fluctuation in the B pathway and some fault or trouble in the A pathway. As shown in the column (a) of FIG. 5, the A pathway has a fault after input of the packet A3 into the receiver device 200A. After the occurrence of the fault, no packet is transferred over the A pathway to the receiver device 200A. The packets A1 through A3 and the packets B1 through B6 are error-free packets.

Figure 5:
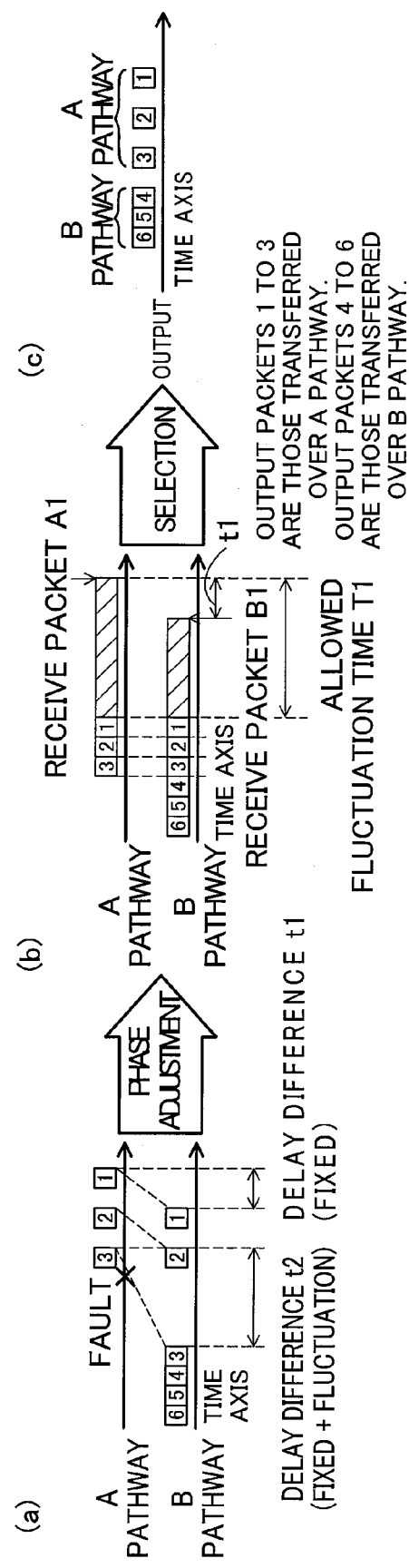
FIG. 5 is a conceptual view showing a series of processing performed by the receiver device on the occurrence of delay fluctuation in the B pathway and some fault or trouble in an A pathway.

As shown in the column (b) of FIG. 5, on elapse of the allowed fluctuation time T1 since reception of the packet A1 by the band detector 202A, the selector 206A simultaneously reads out the packets accumulated in the memory 204$m$1 and the corresponding packets accumulated in the memory 204$m$2. Namely the phase of each packet received over the A pathway and the phase of a corresponding packet received over the B pathway are adjusted to the same phase.

The selector 206A successively selects packets with the high reliability. The packets A1 through A3 transferred over the A pathway arrive earlier at the receiver device 200A and are thus selected for the output packets 1 through 3. The packets B4 through B6 transferred over the B pathway are selected for the output packets 4 through 6, since no packets have been received over the A pathway after the packet A3.

As explained above, the packets B4 through B6 transferred over the B pathway have been accumulated in the memory 204m2. On the occasion of a switchover of the transmission path from the A pathway to the B pathway due to some fault arising in the A pathway, even when the B pathway has some delay fluctuation, the selector 206A can sequentially read out and output the packets B4 through B6 subsequent to the packets A3 and B3. This arrangement ensures the instantaneous interruption-free switchover.

As shown in the column (c) of FIG. 5, the output band of the output packets 1 through 3 is controlled to be equal to the input band of the packets A1 through A3 transferred over the A pathway, while the output band of the output packets 4 through 6 is controlled to be equal to the input band of the packets B4 through B6 transferred over the B pathway. In the transmission system 3000A of the embodiment, the packet output interval is not changed from the packet input interval by a switchover of the transmission path from the A pathway to the B pathway. The output packets are thus transmitted from the receiver device 200A at the same packet interval as the packet interval of the input packets received into the receiver device 200A. In the column (c) of FIG. 5, the packets 4 through 6 are burst. This burst is caused by the burst originally occurring in the packets received over the B pathway and is not newly caused in the transmission system 3000A.

The effect of the first embodiment on the occurrence of packet missing in the A pathway is explained with reference to FIG. 6. FIG. 6 is a conceptual view showing a series of processing performed by the receiver device 200A on the occurrence of packet missing in the A pathway. As shown in the column (a) of FIG. 6, packets are transferred over the A pathway at a fixed packet interval or a fixed band, while the corresponding packets are transferred over the B pathway at the fixed packet interval or the fixed band with a fixed delay difference t1 relative to the A pathway.

Figure 6:
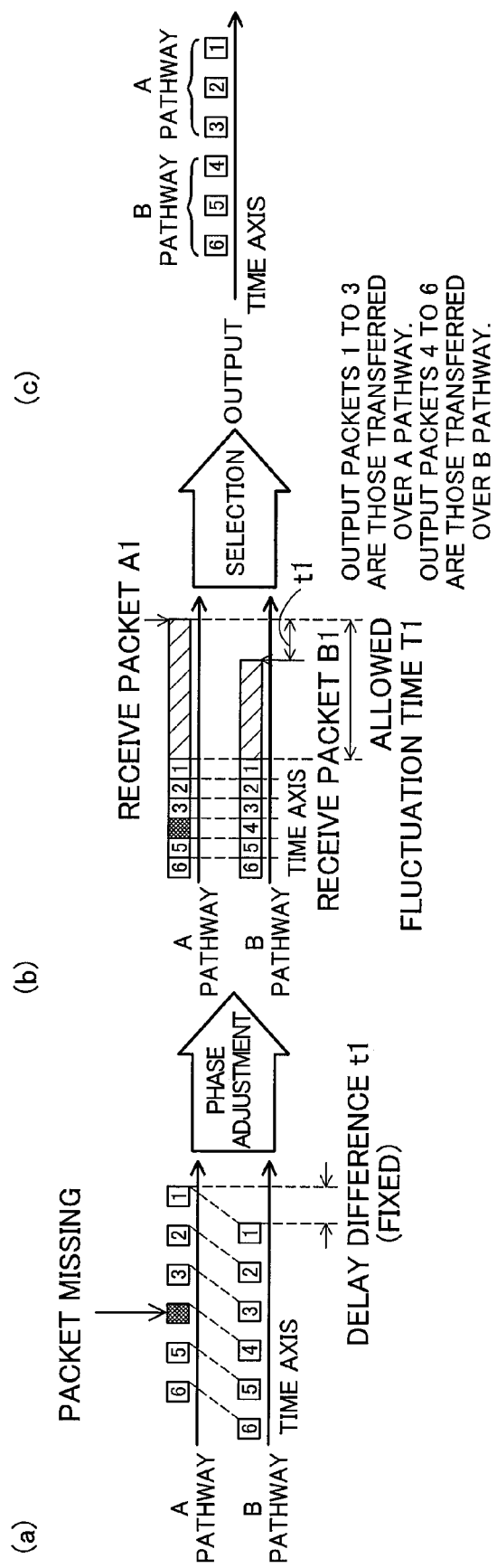
FIG. 6 is a conceptual view showing a series of processing performed by the receiver device on the occurrence of packet missing in the A pathway.

As shown in the column (a) of FIG. 6, the packet A4 is missing in the A pathway. As shown in the column (b) of FIG. 6, on elapse of the allowed fluctuation time T1 since reception of the packet A1 by the band detector 202A, the selector 206A reads out the packets accumulated in the memory 204m1 and the corresponding packets accumulated in the memory 204m2. Namely the phase of each packet received over the A pathway and the phase of a corresponding packet received over the B pathway are adjusted to the same phase.

The selector 206A successively selects packets with the high reliability. The packets A1 through A3 transferred over the A pathway arrive earlier at the receiver device 200A and are thus selected for the output packets 1 through 3. The packet A4 is missing in the A pathway, so that the packet B4 transferred over the B pathway is selected for the output packet 4. According to a concrete procedure, after reading out the packet A3 and the packet B3 and selectively outputting the packet with the high reliability, the selector 206A (FIG. 1) reads out a packet accumulated after the packet A3 from the memory 204m1 and a packet accumulated after the packet B3 from the memory 204m2. Since the packet A4 is missing in the A pathway, the selector 206A reads out the packet A5 from the memory 204m1 and the packet B4 from the memory 204m2. The packet A5 is not the packet to immediately follow the packet A3. The selector 206A accordingly selects the packet B4 as the packet with the high reliability and recognizes the occurrence of packet missing in the A pathway. Because of the occurrence of packet missing in the A pathway, the packets B5 and B6 transferred over the B pathway are selected as the packets with the high reliability for the output packets 5 and 6.

As explained above, the packets B1 through B6 transferred over the B pathway have been accumulated in the memory 204m2. On the occasion of a switchover of the transmission path from the A pathway to the B pathway due to packet missing in the A pathway, even when the B pathway has some delay, the selector 206A can sequentially read out and output the packets B4 through B6. This arrangement ensures the instantaneous interruption-free switchover.

As shown in the column (c) of FIG. 6, the output band of the output packets 1 through 3 is controlled to be equal to the input band of the packets A1 through A3 transferred over the A pathway, while the output band of the output packets 4 through 6 is controlled to be equal to the input band of the packets B4 through B6 transferred over the B pathway. In the transmission system 3000A of the embodiment, the output packets are thus transmitted from the receiver device 200A at the same packet interval as the packet interval of the input packets received into the receiver device 200A. In the illustrated example of FIG. 6, the input band of the packets A1 through A6 is equal to the input band of the packets B1 through B6. A switchover of the transmission path in the course of packet transmission does not change the output band of the output packets 1 through 6. An output stream of the output packets 1 through 6 accordingly has a fixed output interval. The user packets input from the user terminal 1000 can thus be output to the user terminal 2000 at the fixed packet interval without any packet missing.

B. Second Embodiment

B-1. Configuration of Second Embodiment

Figure 7:
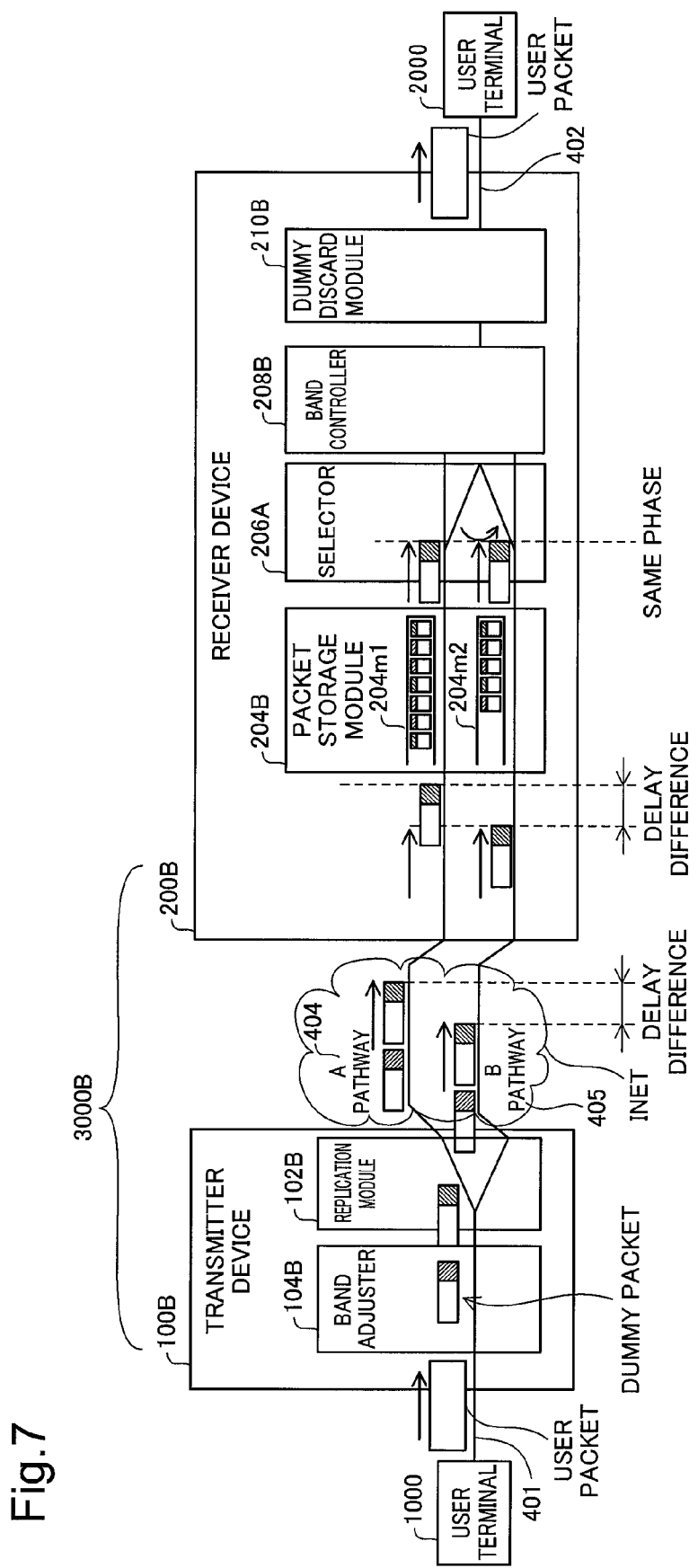
FIG. 7 is an explanatory view illustrating the configuration of another transmission system in accordance with a second embodiment of the invention.

A second embodiment of the present invention is described below. FIG. 7 illustrates the configuration of a transmission system 3000B in the second embodiment of the invention. Like the transmission system 3000A of the first embodiment, the transmission system 3000B of the second embodiment is located between a user terminal 1000 and another user terminal 2000 interconnected via the Internet. As illustrated, the transmission system 3000B of the second embodiment has a transmitter device 100B and a receiver device 200B, similar to the transmission system 3000A of the first embodiment. The difference of the transmission system 3000B of the second embodiment from the transmission system 3000A of the first embodiment is that the input band of each user packet is computed by the transmitter device 100B, in place of the receiver device 200B. Such modification desirably relieves the processing load of the receiver device 200B. The like constituents of the second embodiment to those of the first embodiment are shown by the like numerals or symbols and are not specifically explained here. In the configuration of the second embodiment, the transmitter device 100B and the receiver device 200B are interconnected via the transmission path 404 or the A pathway and via the transmission path 405 or the B pathway, as in the configuration of the first embodiment. The user terminal 1000 and the user terminal 2000 are respectively connected to the transmission system 3000B via the networks 401 and 402.

As illustrated, the transmitter device 100B includes a band adjuster 104B and a replication module 102B. The band adjuster 104B in the configuration of this embodiment corresponds to the first receiver and the band adjuster in the claims of the invention.

The band adjuster 104B identifies whether each user packet input from the user terminal 1000 is the object or non-object of instantaneous interruption-free switchover. Upon identification of the user packet as the object of instantaneous interruption-free switchover, the band adjuster 104B computes the input band of the user packet according to Equation (1) given above as explained previously in the first embodiment. When the computed input band is lower than a preset reference band, the band adjuster 104B inserts a dummy packet after the user packet to adjust the total band of the user packet and the inserted dummy packet to the preset reference band.

The identification of whether each user packet is the object or non-object of instantaneous interruption-free switchover is based on the header information included in the user packet as explained previously in the first embodiment. The reference band is set, for example, based on an available band of the user terminal 2000. The reference band is also used for subsequent band control performed in the receiver device 200B.

In this embodiment, the dummy packet is used to adjust the band of a packet transferred from the transmitter device 100B to the preset reference band. As explained later, the dummy packet is discarded in the receiver device 200B and thus does not reach the user terminal 2000.

The replication module 102B assigns overhead information including a sequence number and an instantaneous interruption-free switchover identifier to the user packet, so as to capsulate the user packet with the assigned overhead information. The replication module 102B also assigns overhead information including a dummy packet identification mark to the dummy packet, so as to capsulate the dummy packet with the assigned overhead information. The replication module 102B replicates both the capsulated user packet and the capsulated dummy packet and outputs the replicated user packets and the replicated dummy packets to the transmission path 404 or the A pathway and to the transmission path 405 or the B pathway via respective interfaces (not shown). In the description hereafter, each of the capsulated user packet and the capsulated dummy packet transferred from the transmitter device 100B may simply be referred to as the 'packet'.

The receiver device 200B includes a packet storage module 204B, a selector 206A, a band controller 208B, and a dummy discard module 210B. The packet storage module 204B in the configuration of this embodiment corresponds to the second receiver and the storage module in the claims of the invention. The selector 206A of the embodiment is equivalent to the packet selector in the claims of the invention. The band controller 208B and the dummy discard module 210B of the embodiment are equivalent to the output module in the claims of the invention.

The packet storage module 204B includes a memory 204m1 provided for the transmission path 404 and a memory 204m2 provided for the transmission path 405 and functions to receive packets and identify whether each received packet is an object or non-object of instantaneous interruption-free switchover. Like the first embodiment, the identification of whether the received packet is the object or non-object of instantaneous interruption-free switchover is based on the instantaneous interruption-free switchover identifier included in the overhead information of the received packet. Upon identification of each received packet as the object of instantaneous interruption-free switchover, the packet storage module 204B stores the received packet over the transmission path 404 into the memory 204m1, while storing the received packet over the transmission path 405 into the memory 204m2.

As in the first embodiment, the selector 206A respectively reads out one packet from the storage of the memory 204m1 and one packet from the storage of the memory 204m2 in the packet storage module 204B and compares the two read-out packets with each other to select one packet with the high reliability.

The band controller 208B controls the output band of an output stream of the packets output from the selector 206A to the preset reference band. The dummy discard module 210B sequentially discards the dummy packets from the output stream, deletes the overhead information from each of the remaining substantial packets to return the status of each substantial packet to the original form of the user packet input from the user terminal 1000, and outputs the user packet to the user terminal 2000. The receiver device 200B of this embodiment controls the output band of the output stream including the dummy packets to the preset reference band and subsequently discards the dummy packets. This arrangement enables the output band of each user packet output to the user terminal 2000 to be kept equal to the input band of the user packet input from the user terminal 1000.

B-2. Operations of Second Embodiment

Figure 8:
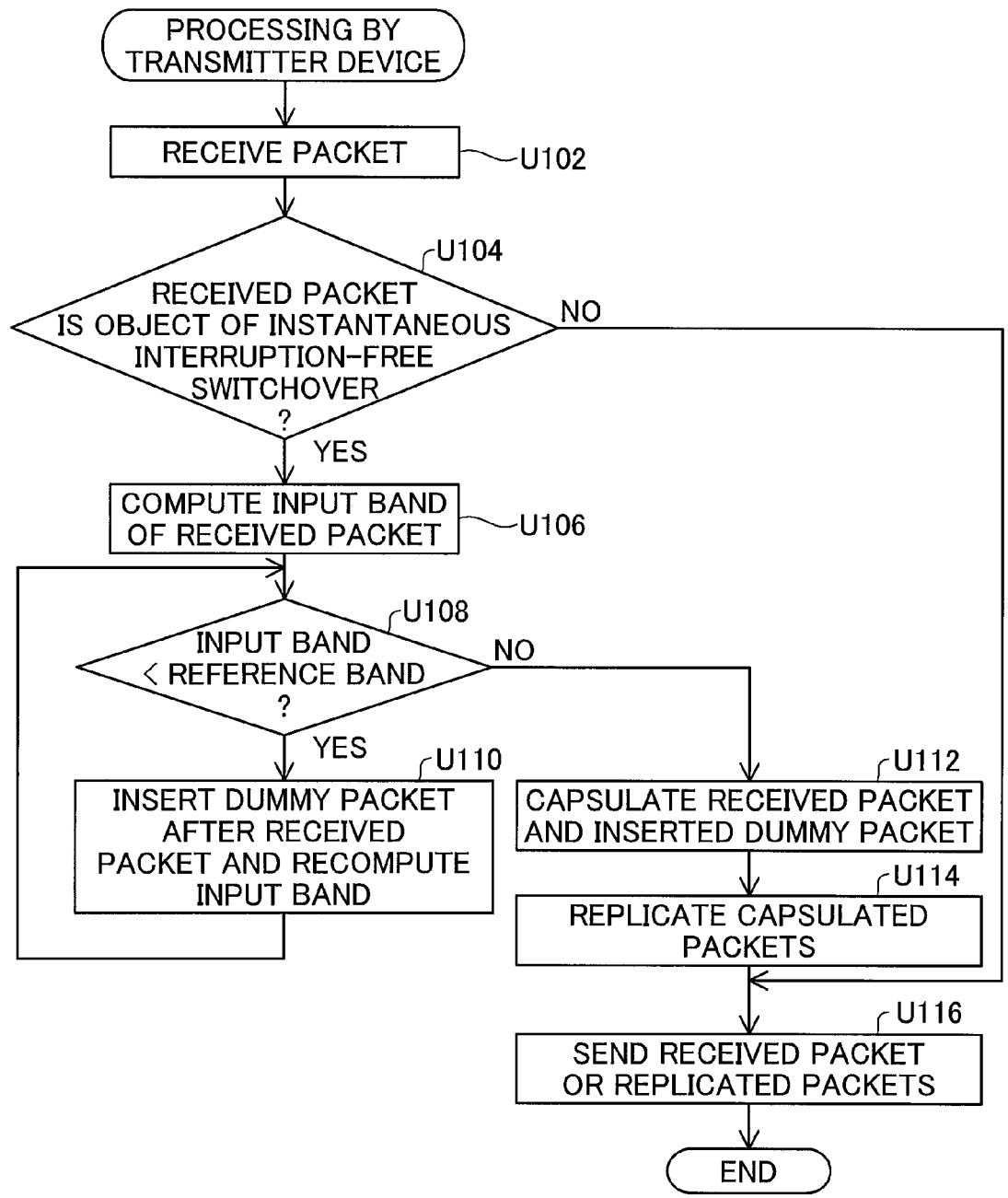
FIG. 8 is a flowchart showing a series of processing performed by a transmitter device in the transmission system of the second embodiment.

Series of operations performed by the transmitter device 100B of the embodiment is described below with reference to FIGS. 7 and 8. FIG. 8 is a flowchart showing a series of processing performed by the transmitter device 100B of the embodiment. This processing flow is executed in response to detection of every packet reception by the band adjuster 104B.

With referring to the flowchart of FIG. 8, the band adjuster 104B (FIG. 7) receives a user packet from the user terminal 1000 (FIG. 7) (step U102) and analyzes the header information of the received user packet to identify whether the received user packet is the object or non-object of instantaneous interruption-free switchover (step U104). Upon identification of the received user packet as the object of instantaneous interruption-free switchover (step U104: YES), the band adjuster 104B computes an input band of the received user packet (step U106).

When the computed input band is lower than the preset reference band (step U108: YES), the band adjuster 104B inserts a dummy packet between the currently received user packet and a subsequently received user packet for the purpose of band adjustment and recomputes the input band including the dummy packet (step U110). The band adjuster 104B determines whether the recomputed input band is still lower than the preset reference band (step U108). The processing of steps U108 and U110 is repeated until the recomputed input band becomes equal to the preset reference band.

When the recomputed input band including the dummy packet becomes equal to the preset reference band (step U108: NO), the replication module 102B assigns overhead information including a sequence number and an instantaneous interruption-free switchover identifier to the received user packet, so as to capsulate the received user packet with the assigned overhead information (step U112). The replication module 102B also assigns overhead information including a sequence number, the instantaneous interruption-free switchover identifier, and a dummy packet identification mark to the inserted dummy packet, so as to capsulate the inserted dummy packet with the assigned overhead information (step U112).

The replication module 102B replicates both the capsulated user packet and the capsulated dummy packet to generate two identical replicated user packets and replicated dummy packets (step U114) and outputs the replicated user packets and the replicated dummy packets to the transmission path 404 or the A pathway and to the transmission path 405 or the B pathway via respective interfaces (not shown) (step U116). This concludes the series of processing performed by the transmitter device 100B.

Upon identification of the received user packet as non-object of instantaneous interruption-free switchover (step U104: NO), on the other hand, the transmitter device 100B immediately sends the received user packet to a selected transmission path (for example, the transmission path 404) (step U116) with skipping the processing of steps U106 through U114. This concludes the series of processing performed by the transmitter device 100B.

Figure 9:
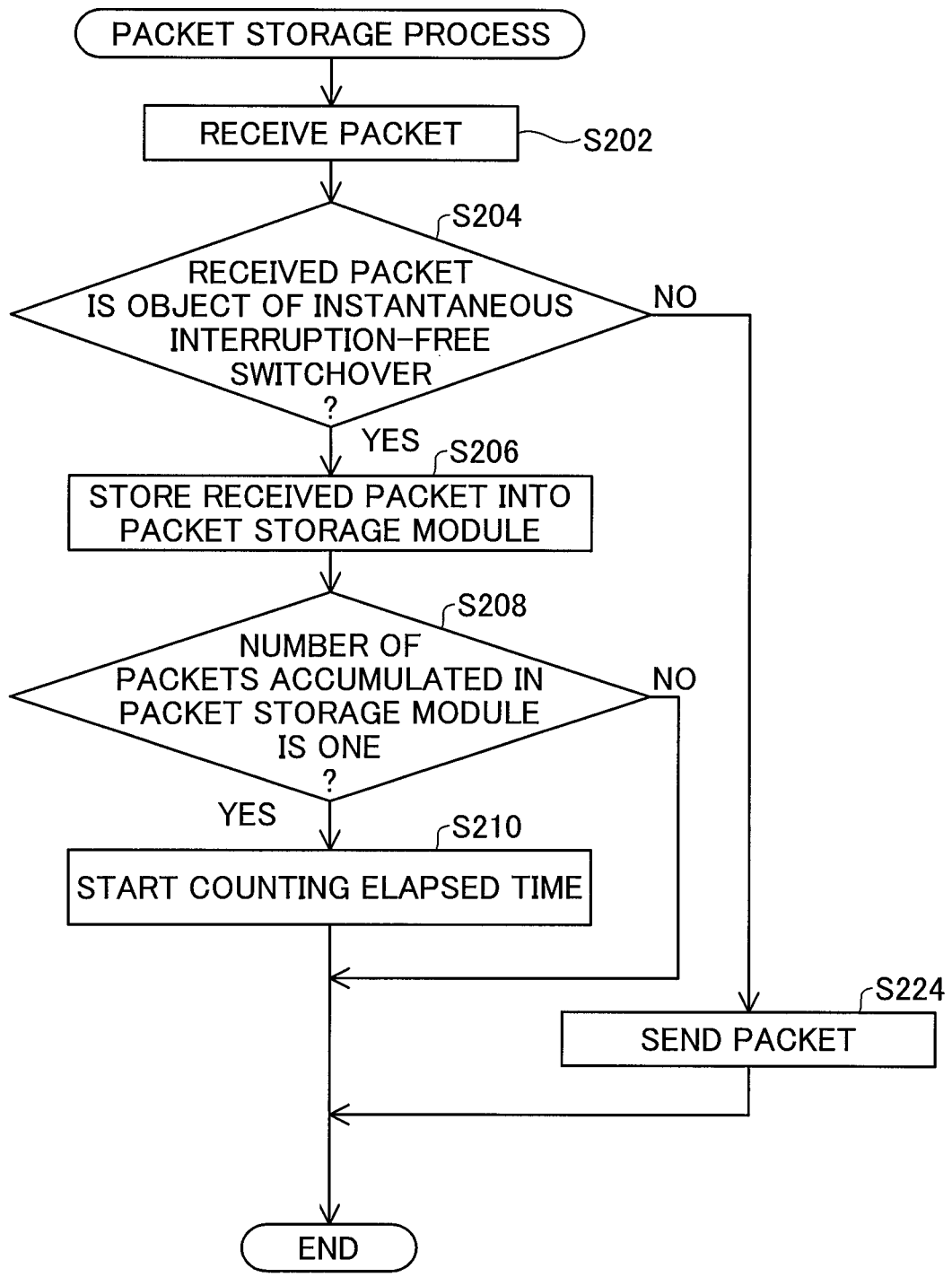
FIG. 9 is a flowchart showing a packet storage process performed by a receiver device in the transmission system of the second embodiment.
Figure 10:
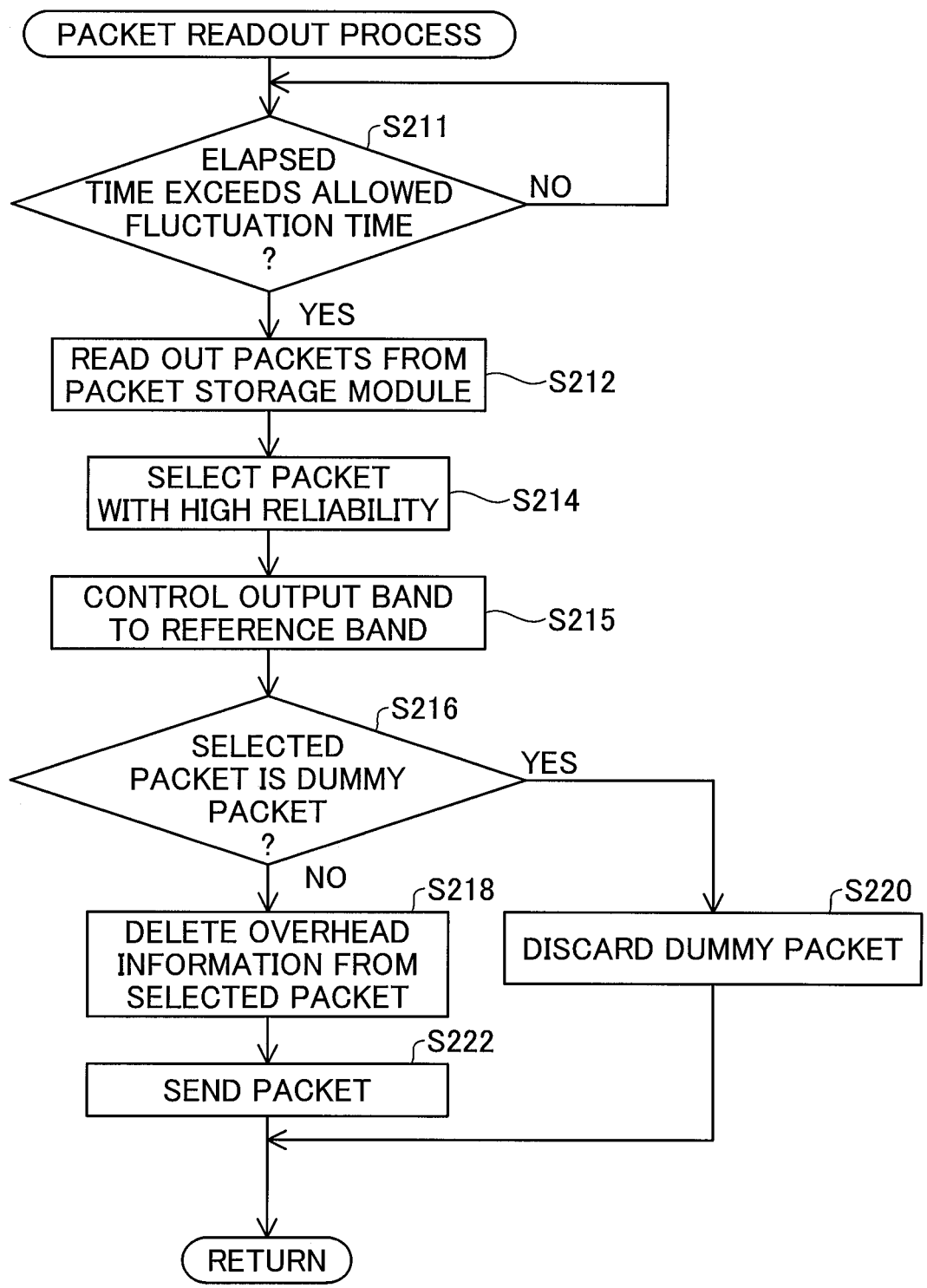
FIG. 10 is a flowchart showing a packet readout process performed by the receiver device in the second embodiment.

Series of processing performed by the receiver device 200B of the embodiment are described below with reference to FIGS. 7, 9, and 10. FIG. 9 is a flowchart showing a packet storage process performed by the receiver device 200B of the embodiment. This packet storage process is executed in response to detection of every packet reception by the packet storage module 204B. FIG. 10 is a flowchart showing a packet readout process performed by the receiver device 200B of the embodiment. This packet readout process is triggered by detection of every packet reception by the packet storage module 204B. Every time a packet is received, the received packet is stored. The receiver device 200B thereby successively accumulates the packets as in the first embodiment. When the allowed fluctuation time has elapsed since reception of a first packet, the receiver device 200B sequentially reads out the accumulated packets and selectively outputs adequate packets.

In the transmission system 3000B of the embodiment, it is assumed that a packet transferred via the transmission path 404 arrives at the receiver device 200B earlier than a corresponding packet transferred via the transmission path 405 as shown in FIG. 7. The following describes a series of processing performed by the receiver device 200B when a packet having a sequence number 1 is transferred via the transmission path 404 and enters the receiver device 200B. As explained previously in the first embodiment, each packet received over each transmission path is named by the combination of the transmission path with the sequence number of the packet.

The series of packet storage process performed by the receiver device 200B of the embodiment is explained with reference to the flowchart of FIG. 9. The packet storage process of the second embodiment performed by the receiver device 200B is similar to the packet storage process of the first embodiment performed by the receiver device 200A with omitting the computation of the input band and extraction of the sequence band performed at step S106 in the first embodiment and is thus not specifically explained here. Unlike the configuration of the first embodiment, in the configuration of the second embodiment, the capsulated user packet is transferred together with the capsulated dummy packet from the transmitter device 100B to the receiver device 200B (FIG. 7) as described above. The receiver device 200B then receives and stores the capsulated user packet with the capsulated dummy packet. Namely the capsulated dummy packets are accumulated with the capsulated user packets in the packet storage module 204B (FIG. 7).

The packet readout process performed by the receiver device 200B is explained with reference to the flowchart of FIG. 10. The processing of step S211 through S214 in the packet readout process of FIG. 10 performed by the receiver device 200B of the second embodiment is similar to the processing of steps S113 through S116 in the packet readout process of FIG. 3 performed by the receiver device 200A of the first embodiment and is thus not specifically explained here. Only the subsequent processing of steps S215 through S222 is described below.

For example, it is assumed that packets A1 through A6 have been stored in the memory 204m1, and the packets B1 through B4 have been stored in the memory 204m2, at the time when the allowed fluctuation time has elapsed. The packets A2, A4, A6, B2, and B4 are dummy packets.

After selection of the packet with the high reliability on elapse of the allowed fluctuation time (steps S211 through S214), the band controller 208B controls the output band of the selected packet to the preset reference band (step S215). The dummy discard module 210B identifies whether the selected packet is a dummy packet (step S216). Since either the packet A1 or the packet B1 is selected at this moment as the packet with the high reliability, the selected packet is identified as a non-dummy packet (step S216: NO). The dummy discard module 210B then deletes the overhead information from the selected packet to return the status of the selected packet to the original form of the user packet input from the user terminal 1000 (step S218) and sends the user packet to the user terminal 2000 (step S222). The processing flow then returns to step S211.

The selector 206A subsequently reads out the packet A2 and the packet B2 (step S212) selects the packet with the high reliability (step S214). The band controller 208B controls the output band of the selected packet to the preset reference band (step S215). The dummy discard module 210B identifies whether the selected packet is a dummy packet (step S216). The selected packet, that is, either the packet A2 or the packet B2, is identified as a dummy packet (step S216: YES), and the dummy discard module 210B discards the dummy packet as the selected packet (step S220). The processing flow then returns to step S211.

Controlling the output band of the selected packet to the preset reference band and discarding the dummy packet enable the output band of a user packet to be kept equal to the input band of the user packet transferred to the transmitter device 100B.

Referring back to the flowchart of FIG. 9, upon identification of the received packet as non-object of instantaneous interruption-free switchover by the packet storage module 204B (step S204: NO), the transmission system 3000B sends the received packet to the user terminal 2000 (step S224) with skipping the processing of steps S206 through S210 and then immediately terminates the packet storage process.

B-3. Effects of Second Embodiment

Figure 11:
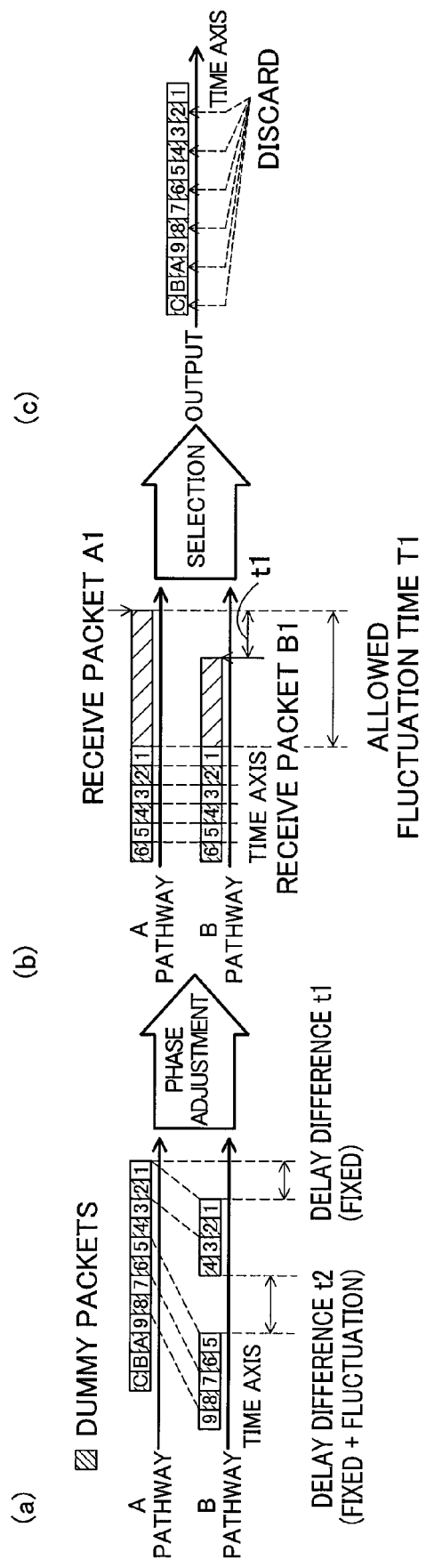
FIG. 11 is a conceptual view showing a series of processing performed by the receiver device on the occurrence of delay fluctuation in the B pathway.

The effects of the second embodiment are described below with reference to FIGS. 11 and 12. The effect of the second embodiment on the occurrence of delay fluctuation in the B pathway is explained with reference to FIG. 11. FIG. 11 is a conceptual view showing a series of processing performed by the receiver device 200B on the occurrence of delay fluctuation in the B pathway. Each solid rightward arrow represents a time axis of the A pathway or the B pathway and indicates that the righter side represents the older time (the greater past time).

The column (a) of FIG. 11 conceptually shows packet intervals in the A pathway and in the B pathway. As explained previously, the transmitter device 100B of this embodiment inserts a dummy packet after a received packet, adjusts the input band of the received packet including the dummy packet to the preset reference band, replicates the received packet and the dummy packet, and transfers the replicated packets to the A pathway and to the B pathway. In the illustrated example of FIG. 11, hatched squares represent dummy packets. Namely '2', '4', '6', '8', 'A', and 'C' are dummy packets.

As shown in the column (a) of FIG. 11, the packets with the alternately inserted dummy packets are transferred at a fixed packet interval or a fixed band in the A pathway, while the B pathway has a delay difference relative to the A pathway. The delay difference of the B pathway relative to the A pathway has some variation among the respective packets. Namely there is a delay fluctuation.

As shown in the column (a) of FIG. 11, the packets B1 through B4 have a fixed delay difference ti relative to the packets A1 through A4. The packet B5 has a delay difference t2 (including fluctuation) relative to the packet A5. The delay difference t2 is greater than the delay difference t1.

The received packets are sequentially read out after elapse of an allowed fluctuation time T1 as explained previously. The column (b) of FIG. 11 conceptually shows a process of reading out packets with time. The packet B1 is received with a delay after reception of the packet A1 as shown in the column (a) of FIG. 11. Namely the packet A1 is read out after elapse of the allowed fluctuation time T1 since its reception, while the packet B1 is read out after elapse of the (allowed fluctuation time T1–fixed delay difference t1) since its reception.

The column (c) of FIG. 11 conceptually shows output of packets. Here it is assumed that the packets A5 through AC transferred via the A pathway have garbled data. The selector 206A then selects the packets A1 through A4 transferred via the A pathway and subsequently the packets B5 through BC transferred via the B pathway. As shown in the column (c) of FIG. 11, the band controller 208B controls the output band of the selected packets to the preset reference band, while the dummy discard module 210B discards the dummy packets.

As described above, the transmitter device 100B adjusts the total band of each user packet and an inserted dummy packet to the preset reference band. The receiver device 200B controls the output band of the respective output packets to the preset reference band and discards the dummy packets as shown in the column (c) of FIG. 11. This enables the output band of each user packet output to the user terminal 2000 to be kept equal to the input band of the user packet input from the user terminal 1000 to the transmitter device 100B. A switchover of the transmission path from the A pathway to the B pathway does not change the packet interval of the output packets to the user terminal 2000 from the packet interval of the input packets from the user terminal 1000. This arrangement thus ensures instantaneous interruption-free switchover.

In the transmission system 3000B of this embodiment, the transmitter device 100B computes the input bands of the respective user packets. This arrangement desirably relives the processing load of the receiver device 200B, compared with the transmission system 3000A of the first embodiment.

The effect of the second embodiment on the occurrence of packet missing in the A pathway is explained with reference to FIG. 12. FIG. 12 is a conceptual view showing a series of processing performed by the receiver device 200B on the occurrence of packet missing in the A pathway. As in the illustrated example of FIG. 11, the transmitter device 100B inserts a dummy packet after a received packet, adjusts the input band of the received packet including the dummy packet to the preset reference band, replicates the received packet and the dummy packet, and transfers the replicated packets to the A pathway and to the B pathway. In the illustrated example of FIG. 12, packet transmission over the B pathway has a fixed delay difference t1 relative to packet transmission over the A pathway. The A pathway has missing packet A5. All the other packets are error-free packets.

Figure 12:
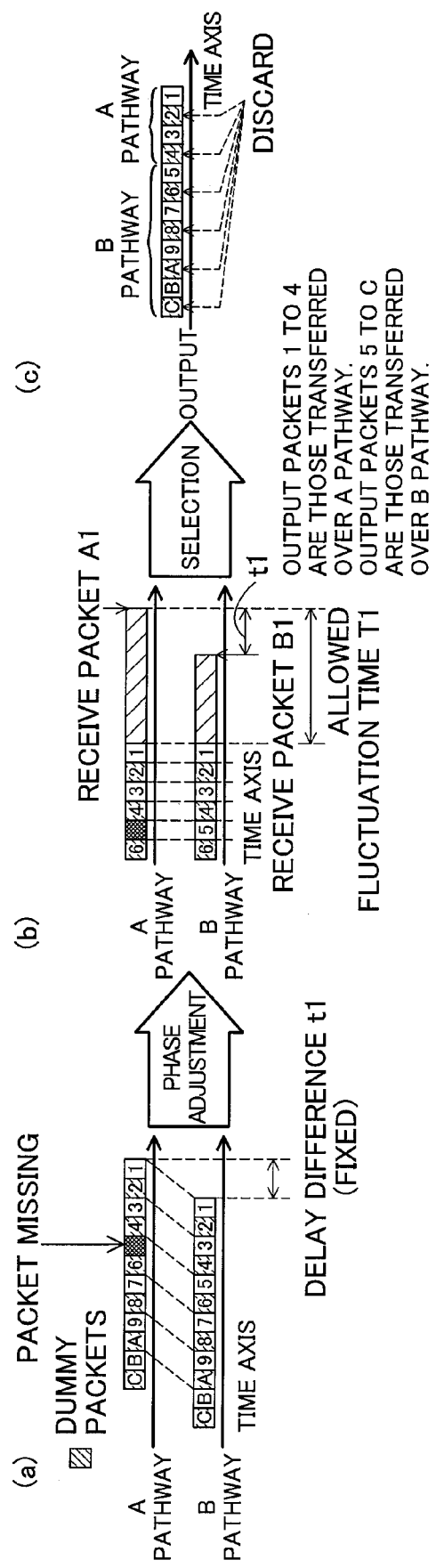
FIG. 12 is a conceptual view showing a series of processing performed by the receiver device on the occurrence of packet missing in the A pathway.

As shown in the column (a) of FIG. 12, the packet A5 is missing in the A pathway. As shown in the column (b) of FIG. 12, on elapse of the allowed fluctuation time T1 since reception of the packet A1 by the packet storage module 204B, the selector 206A reads out the packets accumulated in the memory 204m1 and the corresponding packets accumulated in the memory 204m2. Namely the phase of each packet received over the A pathway and the phase of a corresponding packet received over the B pathway are adjusted to the same phase.

The packets A1 through A4 transferred over the A pathway are all error-free packets and arrive earlier at the receiver device 200B. The packets Al through A4 transferred over the A pathway are thus selected as the packets with the high reliability for the output packets 1 through 4. The packet A5 is missing in the A pathway, so that the packet B5 transferred over the B pathway is selected for the output packet 5 according to the procedure described in the first embodiment. Because of the occurrence of packet missing in the A pathway, the packets B6 through BC transferred over the B pathway are selected as the packets with the high reliability for the output packets 6 through C. The packet 7 and the subsequent packets are omitted from the illustration in the column (b) of FIG. 12.

As shown in the column (c) of FIG. 12, the packets A1 through A4 transferred over the A pathway are output as the output packets I through 4 with the output band controlled to the preset reference band, while the packets B5 through BC transferred over the B pathway are output as the output packets 5 through C with the output band controlled to the preset reference band. The dummy packets 2, 4, 6, 8, A, and C are discarded as shown in the column (c) of FIG. 12.

As described above, the transmitter device 100B adjusts the total band of each user packet and an inserted dummy packet to the preset reference band. The receiver device 200B controls the output band of the respective output packets to the preset reference band and discards the dummy packets as shown in the column (c) of FIG. 12. This enables the output band of each user packet output to the user terminal 2000 to be kept equal to the input band of the user packet input from the user terminal 1000 to the transmitter device 10013.

As explained above, the packets B1 through BC transferred over the B pathway have been accumulated in the memory 204m2. On the occasion of a switchover of the transmission path from the A pathway to the B pathway due to packet missing in the A pathway, even when the B pathway has some delay, the selector 206A can sequentially read out and output the packets B5 through BC. The receiver device 200B controls the output band of the respective output packets to the preset reference band and discards the dummy packets. A switchover of the transmission path from the A pathway to the B pathway does not change the packet interval of the output packets to the user terminal 2000 from the packet interval of the input packets from the user terminal 1000. This arrangement thus ensures instantaneous interruption-free switchover.

C. Third Embodiment

C-1. Configuration of Third Embodiment

Figure 13:
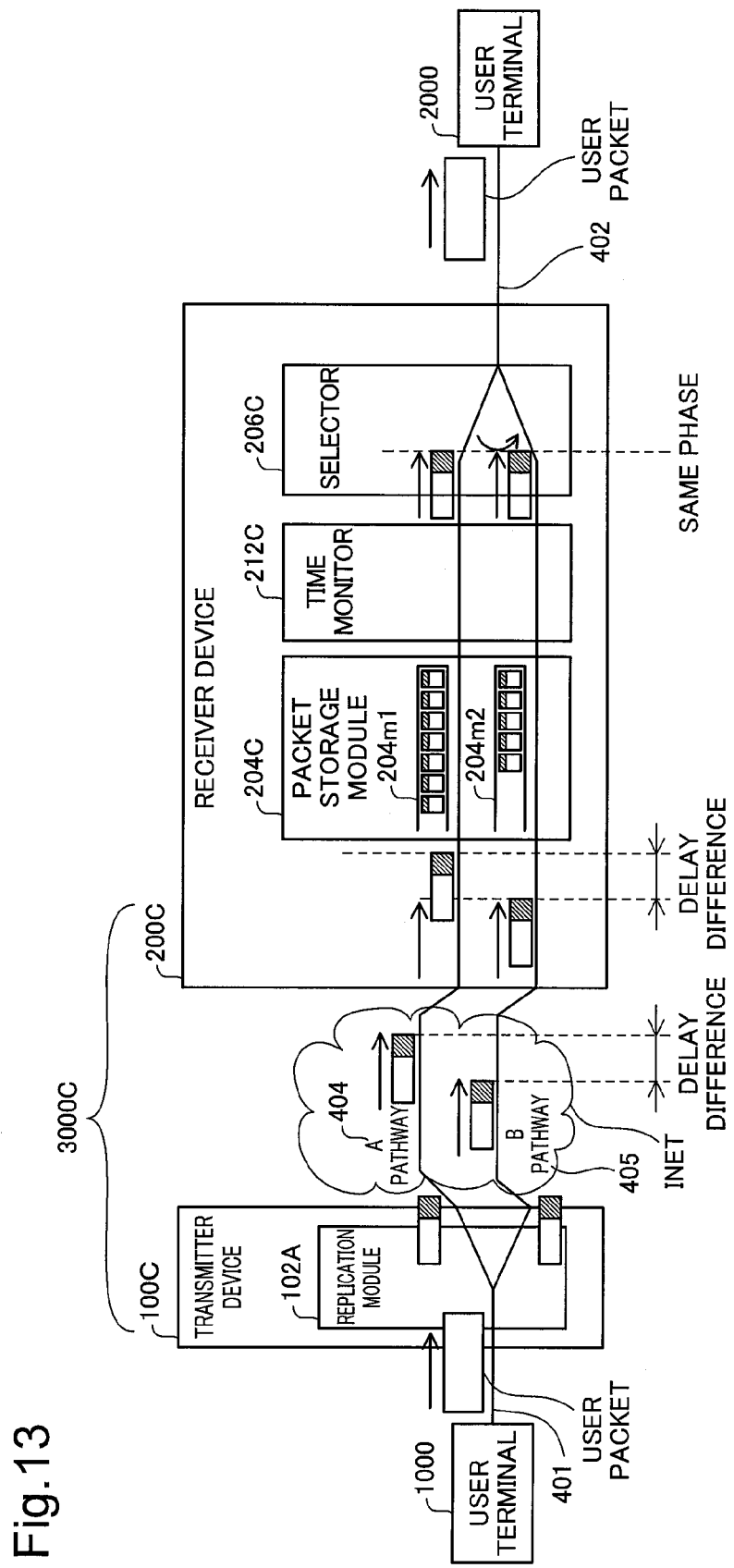
FIG. 13 is an explanatory view illustrating the configuration of still another transmission system in accordance with a third embodiment of the invention.

A third embodiment of the present invention is described below. FIG. 13 illustrates the configuration of a transmission system 3000C in the third embodiment of the invention. Like the transmission system 3000A of the first embodiment, the transmission system 3000C of the third embodiment is located between a user terminal 1000 and another user terminal 2000 interconnected via the Internet. As illustrated, the transmission system 3000C of the third embodiment has a transmitter device 100C and a receiver device 200C, similar to the transmission system 3000A of the first embodiment. The difference of the transmission system 3000C of the third embodiment from the transmission system 3000A of the first embodiment is that the band detector 202A and the band controller 208A included in the receiver device 200A are replaced by a time monitor 212C included in the receiver device 200C. The like constituents of the third embodiment to those of the first embodiment are shown by the like numerals or symbols and are not specifically explained here.

As illustrated, the transmitter device 100C is identical with the transmitter device 100A included in the transmission system 3000A of the first embodiment and is thus not specifically described here.

As illustrated, the receiver device 200C includes a packet storage module 204C, the time monitor 212C, and a selector 206C. The packet storage module 204C in the configuration of this embodiment corresponds to the storage module in the claims of the invention. The selector 206C of the embodiment corresponds to the packet selector and the output module in the claims of the invention.

The packet storage module 204C includes a memory 204m1 provided for the transmission path 404 and a memory 204m2 provided for the transmission path 405 and functions to receive packets and identify whether each received packet is an object or non-object of instantaneous interruption-free switchover. Like the first embodiment, the identification of whether the received packet is the object or non-object of instantaneous interruption-free switchover is based on the instantaneous interruption-free switchover identifier included in the overhead information of the received packet. Upon identification of each received packet as the object of instantaneous interruption-free switchover, the packet storage module 204C stores the received packet over the transmission path 404 into the memory 204m1, while storing the received packet over the transmission path 405 into the memory 204m2. The packet storage module 204C records a sequence number and a packet arrival time of each received packet into a memory (not shown).

The time monitor 212C refers to the sequence number and the packet arrival time of each received packet recorded in the packet storage module 204C and records elapsed time, which has elapsed since reception of the packet transferred over either the transmission path 404 or the transmission path 405 by the packet storage module 204C, in correlation to the sequence number. When the elapsed time exceeds an allowed fluctuation time, the time monitor 212C respectively reads out one packet from the storage of the memory 204m1 and one packet from the storage of the memory 204m2. For example, it is assumed that a packet transferred over the transmission path 404 or the A pathway arrives at the receiver device 200C earlier than a corresponding packet transferred over the transmission path 405 or the B pathway. In this state, packets A1 and B1 are read out on elapse of the allowed fluctuation time since reception of the packet A1. Similarly packets A2 and B2 are read out on elapse of the allowed fluctuation time since reception of the packet A2. The allowed fluctuation time is set in the same manner as the first embodiment described above.

The selector 206C compares the two packets read out by the time monitor 212C with each other, selects one packet with the high reliability, and outputs the selected packet. The criteria of selection of the packets with the high reliability are the same as those described in the first embodiment. The packets may be read out, for example, based on the receipt time of the packet transferred over the transmission path 404. The user packets output to the user terminal 2000 accordingly have the output band equal to the band of the packets transferred over the transmission path 404.

C-2. Operations of Third Embodiment

Figure 14:
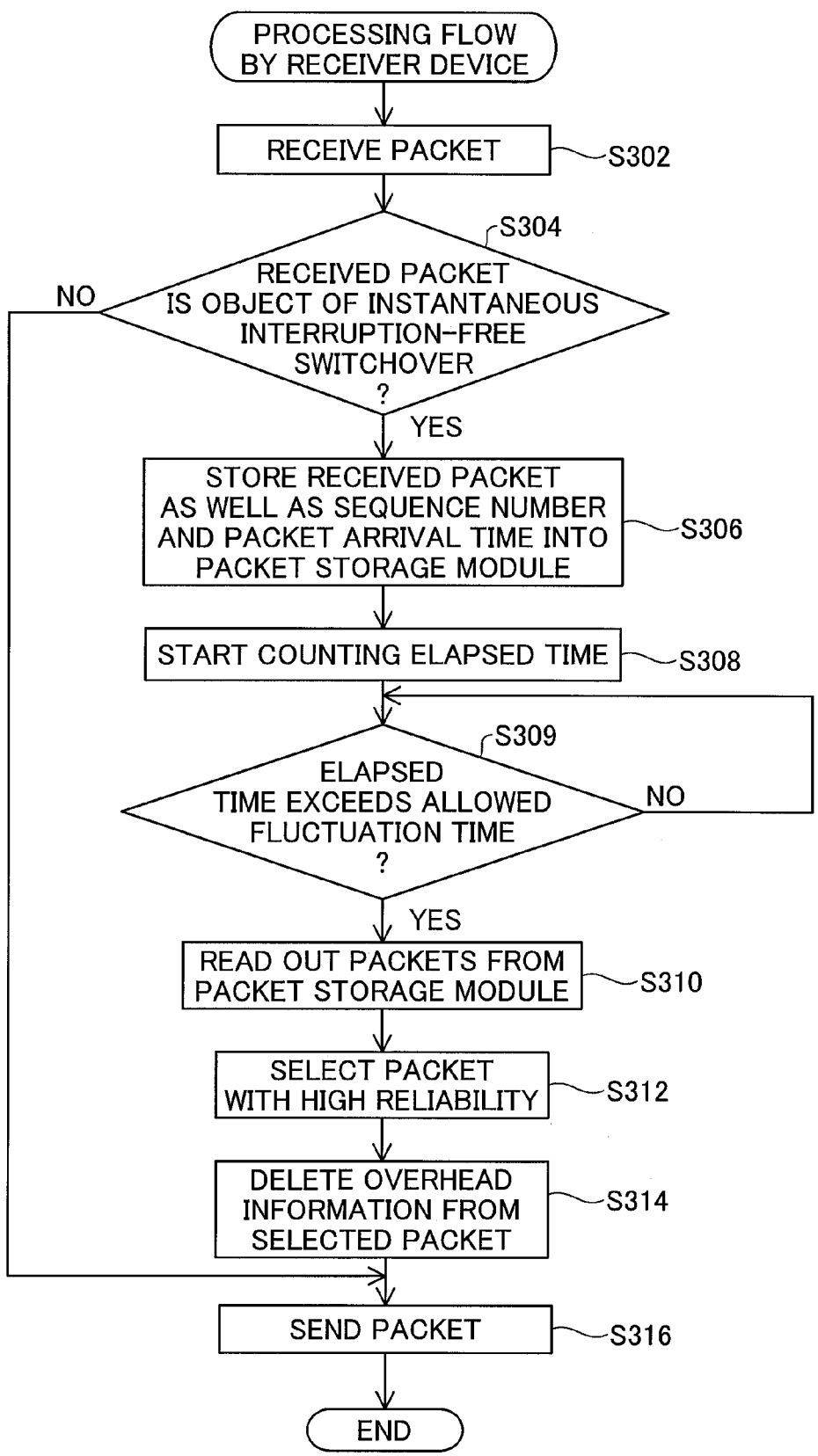
FIG. 14 is a flowchart showing a series of processing performed by a receiver device in the transmission system of the third embodiment.

Series of operations performed in this embodiment are described with reference to the flowchart of FIG. 14. FIG. 14 is a flowchart showing a series of processing performed by the receiver device 200C of the embodiment. This processing flow is triggered by detection of packet reception by the packet storage module 204C and is executed in response to reception of every packet transferred over one transmission path having a packet received earlier. The processing flow of FIG. 14 is not performed for the packets received over the other transmission path having a corresponding packet received later. Each of such packets received over the other transmission path is identified as an object or non-object of instantaneous interruption-free switchover. The packets identified as the objects of instantaneous interruption-free switchover are sequentially accumulated (not shown).

In the transmission system 3000C of the embodiment, it is assumed that a packet transferred via the transmission path 404 arrives at the receiver device 200C earlier than a corresponding packet transferred via the transmission path 405 as shown in FIG. 13. The following describes a series of processing performed by the receiver device 200C when a packet having a sequence number 1 is transferred via the transmission path 404 and enters the receiver device 200C.

As explained previously in the first embodiment, each packet received over each transmission path is named by the combination of the transmission path with the sequence number of the packet.

Referring to the flowchart of FIG. 14, the packet storage module 204C receives the packet A1 transferred over the transmission path 404 or the A pathway (step S302) and analyzes the overhead information included in the received packet A1 to identify whether the user packet included in the received packet A1 is the object or non-object of instantaneous interruption-free switchover (step S304).

Upon identification of the user packet as the object of instantaneous interruption-free switchover (step S304: YES), the packet storage module 204C in step S306 stores the packet A1 into the memory 204m1 and the sequence number and the packet arrival time of the packet A1 into the memory (not shown).

The time monitor 212C starts counting the elapsed time since reception of the packet A1 by the packet storage module 204C (step S308) and determines whether the elapsed time exceeds the 'allowed fluctuation time' (step S309). At this moment, the elapsed time is '0' (step S309: NO), so that the processing flow returns to step S309 to determine the elapse of the allowed fluctuation time again. Namely the time monitor 212C repeats the processing of step S309 until the allowed fluctuation time has elapsed.

Until the elapse of the allowed fluctuation time, multiple packets are received over the transmission path 404 and over the transmission path 405 and are stored in the packet storage module 204C. On elapse of the allowed fluctuation time (step S309: YES), the time monitor 212C respectively reads out one packet from the memory 204m1 and one packet from the memory 204m2 in the packet storage module 204C (step S310).

As described previously, the selector 206C selects one packet with the high reliability (step S312), deletes the overhead information from the selected packet to return the status of the selected packet to the original form of the user packet input from the user terminal 1000 (step S314), and sends the user packet to the user terminal 2000 (step S316). This concludes the processing flow performed by the receiver device 200C.

As in the first embodiment described above, in the receiver device 200C of the third embodiment, the received packets are successively accumulated in the packet storage module 204C. After elapse of the allowed fluctuation time, the receiver device 200C sequentially reads out the packets accumulated in the packet storage module 204C, selects the packets with the high reliability, and sends the user packets obtained from the selected packets. In the configuration of this embodiment, the packets are successively accumulated in the packet storage module 204C. A switchover of the transmission path does not cause any packet missing, since subsequent packets are present in the packet storage module 204C.

Unlike the first embodiment and the second embodiment described above, in the receiver device 200C of the third embodiment, the time monitor 212C counts the elapsed time since the receipt time of each packet transferred over the transmission path 404 or the A pathway. On elapse of the allowed fluctuation time, the receiver device 200C sequentially reads out the packets accumulated in the packet storage module 204C, selects the packets with the high reliability, and sends the user packets obtained from the selected packets. The interval of the packets output to the user terminal 2000 is accordingly equal to the interval of the packets transferred over the transmission path 404 and received by the receiver device 200C. The user terminal 2000 can receive the packets from the user terminal 1000 via the transmission system 3000C at the same band as the band of the packets directly transmitted from the user terminal 1000 to the user terminal 2000.

Referring back to the flowchart of FIG. 14, upon identification of the received packet as non-object of instantaneous interruption-free switchover by the packet storage module 204C (step S304: NO), the transmission system 3000C sends the received packet to the user terminal 2000 (step S316) with skipping the processing of steps S306 through 5314 and then immediately terminates the processing flow.

As described above, when a packet transferred over the transmission path 404 arrives at the receiver device 200C earlier than a corresponding packet transferred over the transmission path 405, the receiver device 200C starts counting the elapsed time since reception of the packet transferred over the transmission path 404 (step S308). In the event of some fault or trouble on the transmission path 404 in the course of packet transmission, subsequent packets are not transferable over the transmission path 404 to the receiver device 200C. In this case, for each subsequent packet received after the occurrence of the fault, the receiver device 200C starts counting the elapsed time since reception of the packet transferred over the transmission path 405 (step S308). On elapse of the allowed fluctuation time since reception of the packet transferred over the transmission path 405, the receiver device 200C reads out packets from the packet storage module 204C. This modified processing is similarly performed in the event of packet missing on the transmission path 404.

C-3. Effects of Third Embodiment

Figure 15:
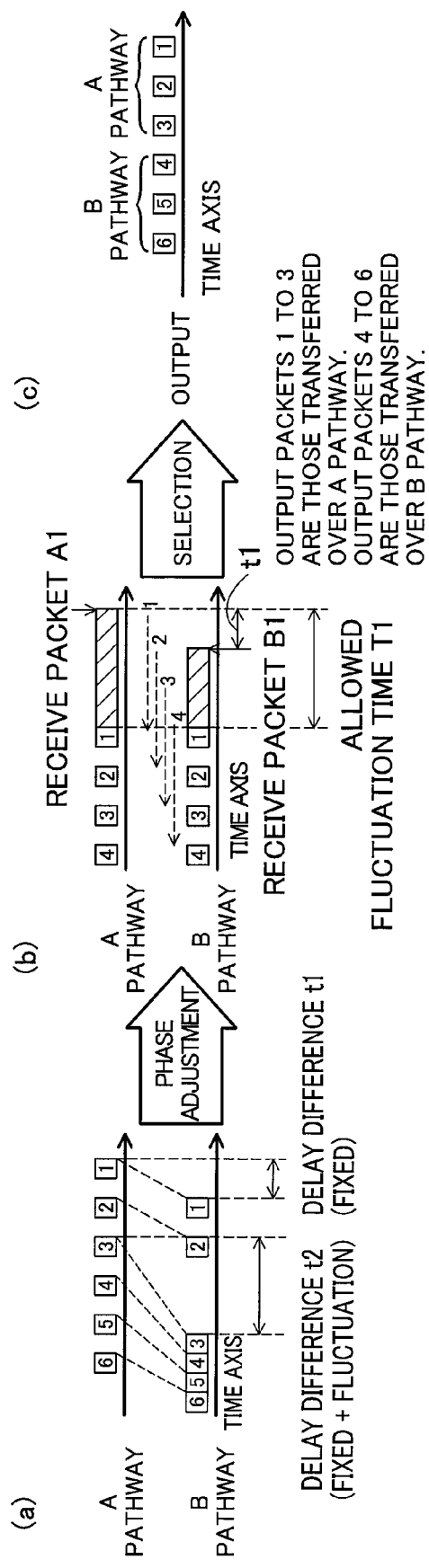
FIG. 15 is a conceptual view showing a series of processing performed by the receiver device on the occurrence of delay fluctuation in the B pathway.

The effects of the third embodiment are described below with reference to FIGS. 15 and 16. The effect of the third embodiment on the occurrence of delay fluctuation in the B pathway is explained with reference to FIG. 15. FIG. 15 is a conceptual view showing a series of processing performed by the receiver device 200C on the occurrence of delay fluctuation in the B pathway. Each solid rightward arrow represents a time axis of the A pathway or the B pathway and indicates that the righter side represents the older time (the greater past time).

The column (a) of FIG. 15 conceptually shows packet intervals in the A pathway and in the B pathway. As shown in the column (a) of FIG. 15, the packets are transferred at a fixed packet interval or a fixed band in the A pathway, while the B pathway has a delay difference relative to the A pathway. The delay difference in the B pathway includes a fixed delay difference ti ascribed to a difference between the lengths of the respective transmission paths and a varying delay difference t2 including 'fluctuation'.

The received packets are sequentially read out after elapse of an allowed fluctuation time T1 as explained previously. The column (b) of FIG. 15 conceptually shows a process of reading out packets with time. Each broken arrow represents a time period from the receipt time of each packet transferred over the A pathway to the read-out time of the packet. The packet A5, A6, B5, and B6 are omitted from the illustration in the column (b) of FIG. 15.

As shown in the column (b) of FIG. 15, on elapse of the allowed fluctuation time T1 since reception of the packet A1 by the packet storage module 204C, the receiver device 200C reads out the packet A1 from the storage of the memory 204*m*1 and the packet B1 from the storage of the memory 204*m*2. Namely the phase of the packet received over the A pathway and the phase of the corresponding packet received over the B pathway are adjusted to the same phase. Similarly on elapse of the allowed fluctuation time T1 since reception of the packet A2 by the packet storage module 204C, the receiver device 200C reads out the packet A2 from the storage of the memory 204*m*1 and the packet B2 from the storage of the memory 204*m*2. In this manner, the receiver device 200C reads out received packets after elapse of the allowed fluctuation time since reception of the packet transferred over the A pathway. Namely packets are successively accumulated into the packet storage module 204C until elapse of the allowed fluctuation time. In the transmission system 3000C of this embodiment, the packets to be read out by the time monitor 212C have been accumulated in the packet storage module 204C. This arrangement ensures instantaneous interruption-free switchover of the transmission path even when the B pathway has delay fluctuation.

The column (c) of FIG. 15 conceptually shows output of packets by the selector 206C with time. In the illustrated example of FIG. 15, the selector 206C selects the packets A1 through A3 transferred over the A pathway for the output packets 1 through 3 and the packets B4 through B6 transferred over the B pathway for the output packets 4 through 6. The packets A1 through A6 transferred over the A pathway are received at a fixed packet interval or a fixed band by the packet storage module 204C as shown in the column (a) of FIG. 15. The packets are thus sequentially read out and output at a fixed interval. Namely the interval of the output packets 1 through 6 is kept unchanged from the interval of the packets A1 through A6 transferred over the A pathway. A switchover of the transmission path from the A pathway to the B pathway does not change the packet interval of the output packets to the user terminal 2000 from the packet interval of the input packets from the user terminal 1000. This arrangement thus ensures instantaneous interruption-free switchover.

The effect of the third embodiment on the occurrence of packet missing in the transmission path 404 or in the A pathway is explained with reference to FIG. 16. FIG. 16 is a conceptual view showing a series of processing performed by the receiver device 200C on the occurrence of packet missing in the A pathway. The column (a) of FIG. 16 conceptually shows packet intervals in the A pathway and in the B pathway. As shown in the column (a) of FIG. 16, packets are transferred over the A pathway at a fixed packet interval or a fixed band, while the corresponding packets are transferred over the B pathway at the fixed packet interval or the fixed band with a fixed delay difference t1 relative to the A pathway. As shown in the column (a) of FIG. 16, the packet A4 is missing in the A pathway.

Figure 16:
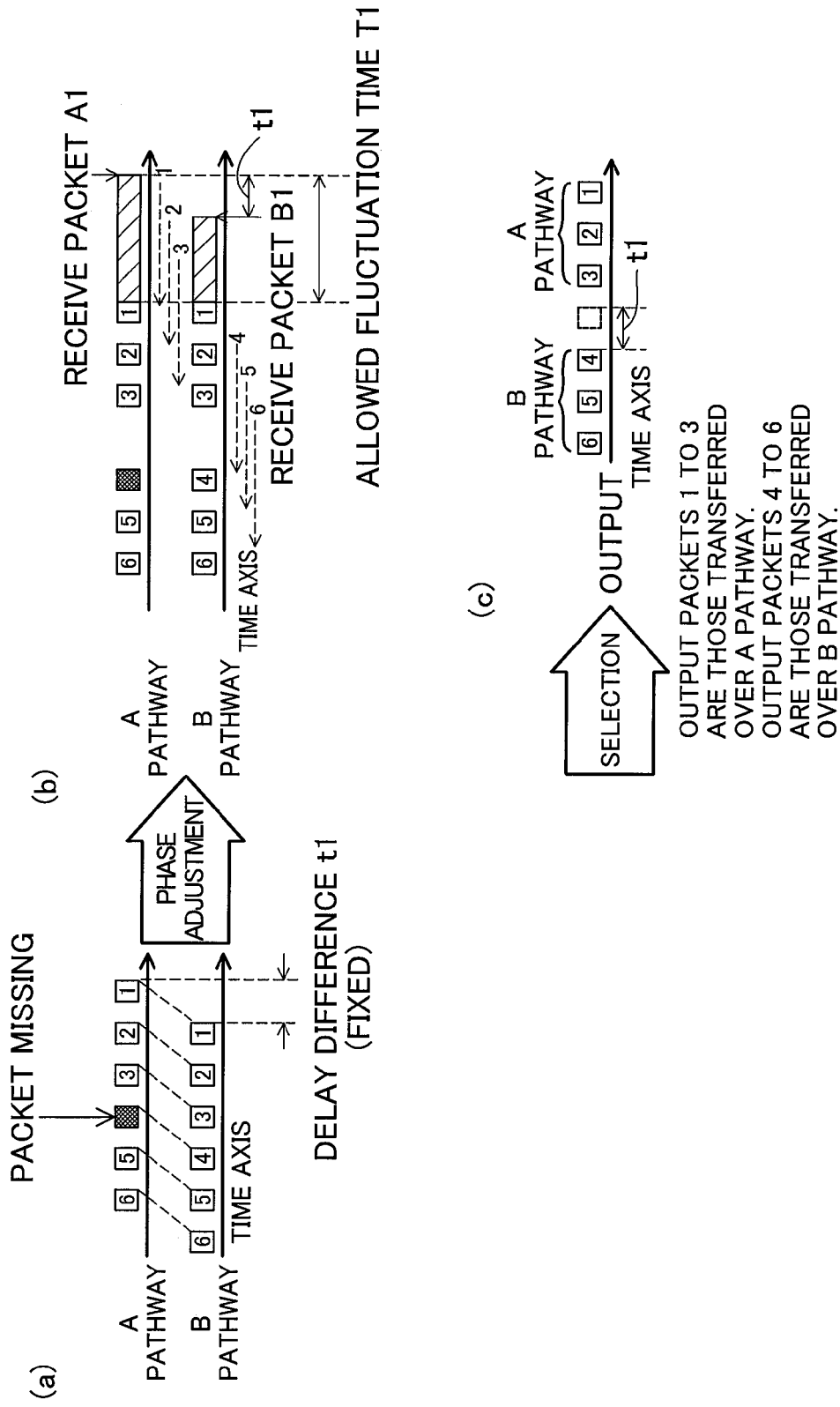
FIG. 16 is a conceptual view showing a series of processing performed by the receiver device on the occurrence of packet missing in the A pathway.
Figure 17:
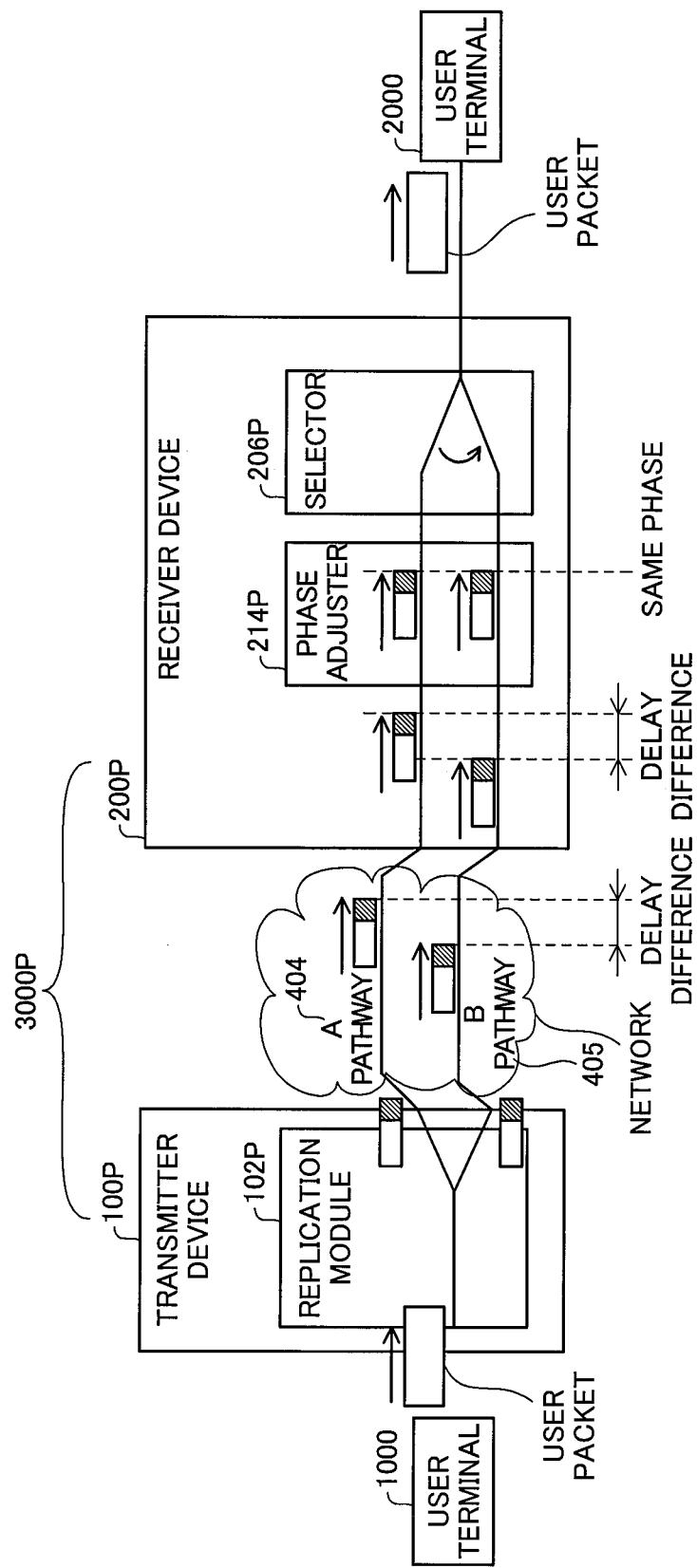
FIG. 17 is an explanatory view illustrating the configuration of a prior art transmission system.
Figure 18:
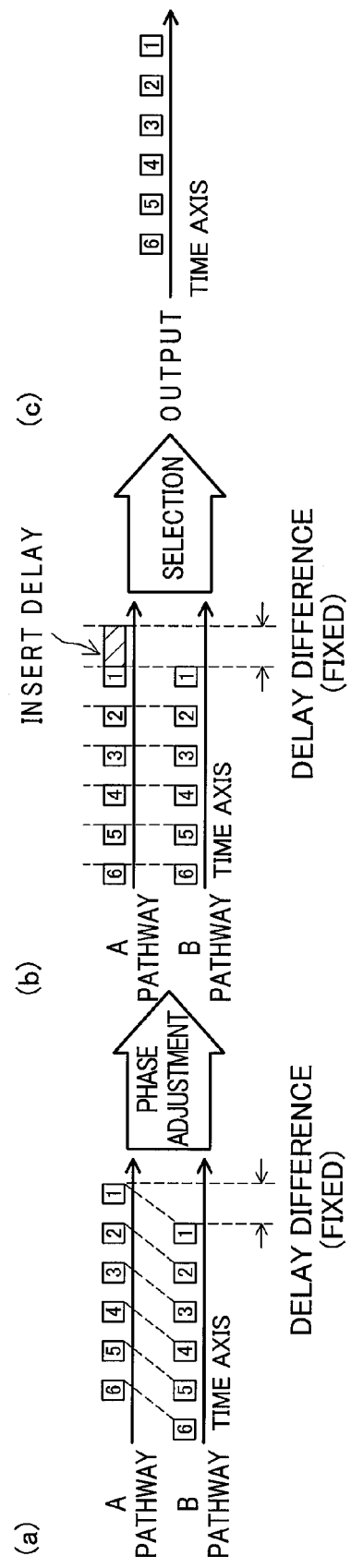
FIG. 18 is a conceptual view showing a transmission path switchover process in the prior art transmission system using leased line service for transmission paths.

The column (b) of FIG. 16 conceptually shows a process of reading out packets with time. Broken arrows represent respective time periods from the receipt times of the packets A1 through A3 transferred over the A pathway to the read-out times of the packets A1 through A3. Broken arrows also represent respective time periods from the receipt times of the packets B4 through B6 transferred over the B pathway to the read-out times of the packets B4 through B6.

As shown in the column (b) of FIG. 16, on elapse of the allowed fluctuation time since reception of the packet A1 by the packet storage module 204C, the receiver device 200C reads out the packets A1 and B1. Namely the phase of the packet received over the A pathway and the phase of the corresponding packet received over the B pathway are adjusted to the same phase. Similarly on elapse of the allowed fluctuation time since reception of the packet A2 by the packet storage module 204C, the receiver device 200C reads out the packets A2 and B2. On elapse of the allowed fluctuation time since reception of the packet A3 by the packet storage module 204C, the receiver device 200C reads out the packets A3 and B3.

Since the packet A4 is missing and is not received, on elapse of the allowed fluctuation time since reception of the packet B4 transferred over the B pathway by the packet storage module 204C, the receiver device 200C reads out the packet B4 as shown in the column (b) of FIG. 16. On elapse of the allowed fluctuation time since reception of the packet B5 by the packet storage module 204C, the receiver device 200C reads out the packets A5 and B5. On elapse of the allowed fluctuation time since reception of the packet B6 by the packet storage module 204C, the receiver device 1200C reads out the packets A6 and B6.

The column (c) of FIG. 16 conceptually shows output of packets by the selector 206C with time. In the illustrated example of FIG. 16, the selector 206C selects the packets A1 through A3 transferred over the A pathway for the output packets 1 through 3 and the packets B4 through B6 transferred over the B pathway for the output packets 4 through 6. Compared with the case of no occurrence of packet missing in the A pathway and thereby no switchover of the transmission path, a switchover of the transmission path from the A pathway to the B pathway generates a lag of the packet interval equivalent to the fixed delay difference t1 of the B pathway relative to the A pathway as shown in the column (c) of FIG. 16. The packet interval of the output packets 1 through 3 are kept equal to the fixed packet interval or the fixed band of the packets A1 through A3 transferred to the receiver device 200C. Similarly the packet interval of the output packets 4 through 6 are kept equal to the fixed packet interval or the fixed band of the packets B4 through B6 transferred to the receiver device 200C. In the column (c) of FIG. 16, a broken-line square represents an output packet to be output in the case of no switchover of the transmission path. This arrangement enables the user packets input from the user terminal 1000 to be output to the user terminal 2000 with no packet missing and with keeping the packet intervals of the user packets transferred via the respective transmission paths. The transmission system 3000C of the embodiment ensures the instantaneous interruption-free switchover of the transmission path without causing burst of the packets output to the user terminal 2000.

D. Other Aspects

D1. Modification 1

In the transmission system 3000A of the first embodiment, the band controller 208A controls the output band of each packet to be equal to the input band of the packet computed by the band detector 202A. In one modification, the band controller 208A may smooth the output band to a predetermined fixed band. In one example, a multicast copy point may be located in the downstream of the receiver device 200A to send user packets output from the receiver device 200A to multiple user terminals. The hypothetical burst occurring in the user packets input from the user terminal 1000 may result in the occurrence of burst in the user packets output from the receiver device 200A. This may cause buffer overflow at the multicast copy point. The modified operation of the band controller 208A to smooth the output band to the predetermined fixed band desirably reduces the buffer overflow at the multicast copy point.

D2. Modification 2

In the first through the third embodiments described above, the user terminal 1000 is connected with another user terminal 2000 via the Internet. This configuration is, however, neither essential nor restrictive. The principle of the invention is not restrictively applicable to the Internet but may also be applied to transmission of packets via diversity of networks, for example, wide area Ethernet (registered trademark) or ATM network.

D3. Modification 3

In the first through the third embodiments described above, the transmitter device 100A, 100B, or 100C and the receiver device 200A, 200B, or 200C are interconnected via the two transmission paths 404 and 405. The transmitter device and the receiver device may be interconnected via three or more transmission paths. In one modification of the first embodiment where the transmitter device 100A is connected with the receiver device 200A via three or more transmission paths, the packet storage module 204A has three or more memories corresponding to the number of the transmission paths. The packets transferred via each of the transmission paths are successively accumulated in the corresponding memory provided for the transmission path. The selector 206A respectively reads out one packet for each of the multiple transmission paths among the packets accumulated in the corresponding memory provided for the transmission path and selects one packet with the high reliability out of the read-out packets. The packet with the high reliability is selected based on the criteria discussed previously. The packet with no problem, such as packet missing or wrong order arrival, is selected as the packet with the high reliability. When there are multiple problem-free packets, the packet arriving at the receiver device 200A at the earliest timing is selected as the packet with the high reliability. The selection of the packet with the high, reliability is not restricted to this method but may be determined arbitrarily.

The embodiments and their modified examples discussed above are to be considered in all aspects as illustrative and not restrictive. There may be many other modifications, changes, and alterations without departing from the scope or spirit of the main characteristics of the present invention. For example, part or all of the functions performed by the hardware configuration may be actualized by the software configuration as the CPU executes preset programs.

What is claimed is:

1. A receiver device comprising:
a storage module configured to successively receive multiple identical packets which are transferred over multiple transmission paths between a first device and a second device via a network, and accumulate the packets in correlation to each of the multiple transmission paths;
a packet selector configured to sequentially perform a packet selection process with respect to each of the received packets accumulated in the storage module, where after elapse of a predetermined time period since a receipt time of a first packet received by the receiver device, the packet selection process respectively reads out one packet for each of the multiple transmission paths among the received identical packets, which are accumulated in correlation to each of the multiple transmission paths, and selects one packet with higher reliability out of the read-out packets; and
an output module configured to output the packet selected by the packet selector to the second device;
wherein the output module calculates, on a basis of packet size of the selected packet received by the receiver device, an input band of the selected packet, and controls an output band of the selected packet to the calculated input band of the selected packet received by the receiver device and outputs the selected packet with the controlled output band.

2. The receiver device in accordance with claim 1, wherein the output module controls the output band of the selected packet to be equal to the input band of the selected packet.

3. The receiver device in accordance with claim 1, wherein on elapse of every predetermined time period since reception of a packet, which is transferred over one specific transmission path out of the multiple transmission paths, by the receiver device, the packet selector respectively reads out one packet for each of the multiple transmission paths among the received identical packets, which are accumulated in correlation to each of the multiple transmission paths, and selects one packet with higher reliability out of the read-out packets.

4. A packet transmission method of transmitting a packet via a network, the packet transmission method comprising:
receiving multiple identical packets respectively transferred over multiple transmission paths;
successively accumulating received packets in correlation to each of the multiple transmission paths;
determining whether a predetermined time period has elapsed since a receipt time of a first packet;
sequentially repeating a packet selection process with respect to each of the packets accumulated in correlation to each of the multiple transmission paths, after determination of the elapse of the predetermined time period since the receipt time of the first packet, the packet selection process respectively reads out one packet for each of the multiple transmission paths among the received identical packets, which are accumulated in correlation to each of the multiple transmission paths, and selects one packet with higher reliability out of the read-out packets; and
outputting the selected packet;
wherein the outputting step calculates, on a basis of packet size of the selected packet received by the receiver device, an input band of the selected packet, and controls an output band of the calculated selected packet to the calculated input band of the selected packet received by the receiver device and outputs the selected packet with the controlled output band.

5. The packet transmission method in accordance with claim 4, wherein the outputting step controls the output band of the selected packet to be equal to the input band of the selected packet received in the receiving step.

6. The packet transmission method in accordance with claim 4, wherein the determining step determines whether a predetermined time period has elapsed since reception of a packet, which is transferred over one specific transmission path out of the multiple transmission paths, and
the repeating step repeats the packet selection process upon determination of elapse of every predetermined time period since reception of a packet transferred over the specific transmission path out of the multiple transmission paths.

7. A receiver device comprising:
a storage module configured to successively receive multiple identical packets which are transferred over multiple transmission paths between a first device and a second device via a network, and accumulate the packets in correlation to each of the multiple transmission paths;
a packet selector configured to sequentially perform a packet selection process with respect to each of the received packets accumulated in the storage module, where after elapse of a predetermined time period since a receipt time of a first packet received by the receiver device, the packet selection process respectively reads out one packet for each of the multiple transmission paths among the received identical packets, which are accumulated in correlation to each of the multiple transmission paths, and selects one packet with higher reliability out of the read-out packets; and
an output module configured to output the packet selected by the packet selector to the second device;
wherein the output module calculates, on a basis of packet size of the selected packet received by the receiver device, an input band of the selected packet, and sets an output band of the selected packet relative to the calculated input band of the selected packet received by the receiver device, and outputs the selected packet with the set output band.

8. The receiver device in accordance with claim 7, wherein the output module sets the output band of the selected packet to be equal to the input band of the selected packet.

9. A packet transmission method of transmitting a packet via a network, the packet transmission method comprising:
receiving multiple identical packets respectively transferred over multiple transmission paths;
successively accumulating received packets in correlation to each of the multiple transmission paths;
determining whether a predetermined time period has elapsed since a receipt time of a first packet;
sequentially repeating a packet selection process with respect to each of the packets accumulated in correlation to each of the multiple transmission paths, after determination of the elapse of the predetermined time period since the receipt time of the first packet, the packet selection process respectively reads out one packet for each of the multiple transmission paths among the received identical packets, which are accumulated in correlation to each of the multiple transmission paths, and selects one packet with higher reliability out of the read-out packets ; and
outputting the selected packet;
wherein the outputting step calculates, on a basis of packet size of the selected packet received by the receiver device, an input band of the selected packet, and sets an output band of the calculated selected packet relative to the calculated input band of the selected packet received by the receiver device, and outputs the selected packet with the set output band.

10. The packet transmission method in accordance with claim 9, wherein the outputting step controls the output band of the selected packet to be equal to the input band of the selected packet received in the receiving step.

* * * * *